United States Patent [19]
Suzuki et al.

[11] Patent Number: 5,285,220
[45] Date of Patent: Feb. 8, 1994

[54] IMAGE RECORDING APPARATUS WITH TONE CORRECTION FOR INDIVIDUAL RECORDING HEADS

[75] Inventors: Akio Suzuki; Nobuhiko Takekoshi, both of Yokohama; Toshimitsu Danzuka, Tokyo, all of Japan

[73] Assignee: Canon Kabushiki Kaisha, Tokyo, Japan

[21] Appl. No.: 902,807

[22] Filed: Jun. 25, 1992

Related U.S. Application Data

[63] Continuation of Ser. No. 617,217, Nov. 23, 1990, abandoned.

[30] Foreign Application Priority Data

| Nov. 22, 1989 | [JP] | Japan | 1-301964 |
| Nov. 22, 1989 | [JP] | Japan | 1-301966 |
| Mar. 1, 1990 | [JP] | Japan | 2-047163 |

[51] Int. Cl.⁵ .......................... B41J 2/05; H04N 1/23
[52] U.S. Cl. .......................... 346/140 R; 346/76 PH; 358/518; 358/296
[58] Field of Search .............. 346/140 R, 76 PH; 358/298, 296, 80, 78, 75

[56] References Cited

U.S. PATENT DOCUMENTS

| 4,313,124 | 1/1982 | Hara . | |
| 4,345,262 | 8/1982 | Shirato et al. . | |
| 4,459,600 | 7/1984 | Sato et al. . | |
| 4,463,359 | 7/1984 | Ayata et al. . | |
| 4,468,112 | 8/1984 | Suzuki et al. . | |
| 4,558,333 | 12/1985 | Sugitani et al. . | |
| 4,723,129 | 2/1988 | Endo et al. . | |
| 4,740,796 | 4/1988 | Endo et al. . | |
| 4,801,948 | 1/1989 | Kato | 346/76 PH |
| 4,827,279 | 5/1989 | Lubinsky | 346/76 PH X |
| 4,827,281 | 5/1989 | Lubinsky et al. | 346/1.1 |
| 4,893,180 | 1/1990 | Shigaki | 358/80 |
| 4,908,712 | 3/1990 | Uchiyama | 358/298 |

FOREIGN PATENT DOCUMENTS

| 0288044 | 10/1988 | European Pat. Off. | B41J 3/04 |
| 0317268 | 5/1989 | European Pat. Off. | H04N 1/40 |
| 56847 | 5/1979 | Japan . | |
| 123670 | 7/1984 | Japan . | |
| 138461 | 8/1984 | Japan . | |
| 71260 | 4/1985 | Japan . | |
| 63-209954 | 12/1988 | Japan . | |

OTHER PUBLICATIONS

Lonis, Robert A.; Storage of Operating Parameters in Memory Integral with Printhead, Xerox Disc. Journal, V8, No. 6, Nov./Dec. 1983, p. 503.

Primary Examiner—Joseph W. Hartary
Attorney, Agent, or Firm—Fitzpatrick, Cella, Harper & Scinto

[57] ABSTRACT

An image recording apparatus includes plural recording heads that eject ink to record an image. Different tone characteristics of the images recorded by the recording heads are corrected by individually correcting the image signal for each head to improve the overall image quality of the image provided by the plural recording heads. Non-uniform density of the image recorded by the recording heads can also be corrected before tone correction is effected.

53 Claims, 23 Drawing Sheets

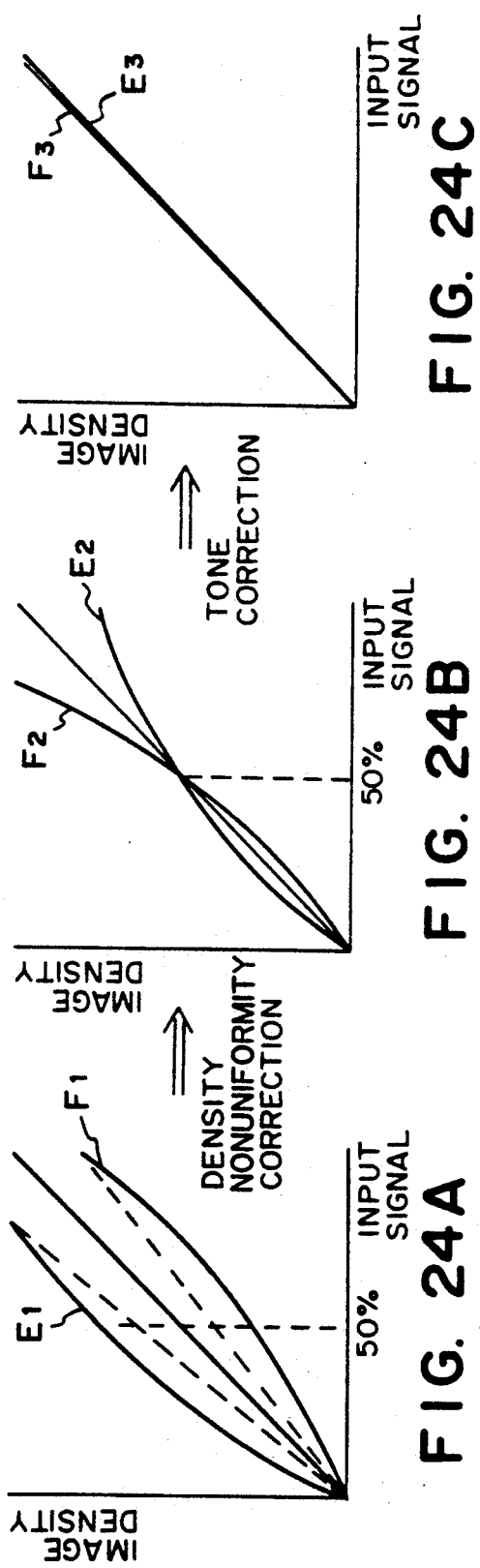
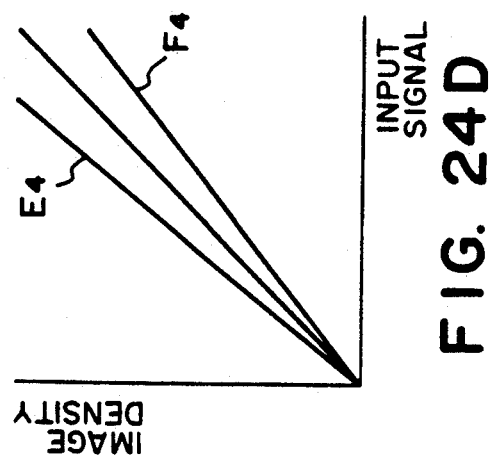

IMAGE RECORDING APPARATUS WITH TONE CORRECTION FOR INDIVIDUAL RECORDING HEADS

This application is a continuation of application Ser. No. 07/617,217 filed Nov. 23, 1990, now abandoned.

FIELD OF THE INVENTION AND RELATED ART

The present invention relates to an image recording apparatus such as a printer, a facsimile machine or a copying machine using a recording head for recording characters and images on a recording material such paper in accordance with an image input signal, and more particularly to an image recording apparatus for recording images or the like using a recording head having a plurality of image recording elements.

Examples of such an image recording apparatus include a dot type such as an ink jet printer or a thermal transfer printer or the like using a recording head. Such an apparatus effects the recording using digital signals, and therefore has become widely used together with wider use of digital office equipment such as word-processors or personal computers.

In the recording apparatus using the recording head, the level of image quality (print quality) is largely influenced by recording density and tone reproducibility.

The recording density may be improved by increasing the density of the image recording elements. However, it is not easy to produce a recording head having a ideal tone characteristics. Therefore, an image recording apparatus having a function of correcting tone reproducibility of the recording head is provided.

However, in such conventional examples, a tone correcting curve is used, and it is fixed to an average level. If the tone characteristics of the recording head are not uniform, then a problem arises, that is, the tone correction is not optimum for all of the recording head. Particularly, when the color image recording operation is effected using plural recording heads for different colors, the color balance becomes different due to the difference in the tone reproducibility, and therefore, a significant problem is presented significant.

The recording head usually is of a multi-type head having plural image recording elements at a high density in order to increase the recording speed. In an ink jet recording head, for example, a multi-nozzle type head is used wherein plural nozzles are disposed at a high density. A thermal head in the thermal printer has usually plural heaters.

However, it is difficult to produce uniform image recording elements in the multi-type head with the result of a certain degree of non-uniformity in the characteristics of the image recording elements. For example in the case of the ink jet type multi-head, the configurations or the like of the nozzles are not uniform. In the multi-type head in the thermal printer, the resistances or the configurations of the heaters are not uniform. If the characteristics of the image recording elements are not uniform, the sizes and the densities of the dots provided by the image recording elements become non-uniform with the result of density non-uniformity in the image recorded.

In order to solve the problem, it has been proposed to correct the signals supplied to the respective image recording elements are corrected in an attempt to provide the uniform densities of the recorded image. In this system, for example, the input signals are corrected to supply a high level signal to the image recording elements having low densities and low level signals to the recording elements having high densities. With this method, when the recording system is such that the recorded dot diameter of the density thereof is changeable, the size of the recorded dot of each of the image recording elements is changed in accordance with the level of the input. For example, in the ink jet recording system of the piezoelectric type, the driving voltage or the driving voltage pulse width supplied to the piezoelectric elements are changed in accordance with the input signal.

In the thermal transfer type, the driving voltage or the pulse width thereof supplied to each of the heaters is changed in accordance with the input signal. By doing so, the dot size or the dot density provided by the recording elements is made uniform, so that the uniform density distribution is provided.

Where the dot diameter or the dot density is not changeable or is changeable only with substantial difficulty, the number of dots is changed in accordance with the input signal. Then, a larger number of dots are recorded by the image recording element having the property of low density, and a smaller number of dots are recorded by the image recording element having the property of high density. As a result, the density distribution is made uniform.

Using such methods, it is possible to correct the density non-uniformity. However if the recording head has non-uniform tone reproducing properties, it is not possible to provide an optimum tone correction for all of the recording heads.

In such a method, even if the non-uniformity is corrected once, the amount of correction is required to be changed if the non-uniformity property changes thereafter.

In the case of the ink jet recording type, precipitation of ink is deposited adjacent ink ejection outlets with use of the recording head, or foreign matter is deposited externally, with the result of change in the density distribution. In the thermal transfer type, the heaters are deteriorated with the result of density distribution changes.

If such occurs the density non-uniformity correction at the initial setting becomes insufficient, so that the non-uniformity becomes conspicuous with use of the recording head.

As for a known method for solving the problem, the density non-uniformity distribution is periodically detected to re-correct the density non-uniformity correcting data. With this method, even if the density non-uniformity distribution of the recording head changes, the correction data are changed in accordance with the change, and therefore, uniform images can be provided at all times.

In this method, the correcting data are produced where the machine is actually used, so that the time required for the production of the correcting data is desired to be very short in order to reduce the inoperable period of the machine. However, the effect of correction is not satisfactory when the detection of the non-uniformity and the production of the correcting data are carried out only once. Sometimes, and several such operations had to be carried out to obtain the uniform image.

It has been found that the cause of the problem is in the differences of the tone reproducibilities in the individual recording heads. More particularly, even if a predetermined amount of correction is imposed, the actual corrections of the non-uniformity is different if the tone reproducibility is different.

Where the tone reproducibilities of the recording head are different, the required amount of correction is different, and therefore, the correction of the density non-uniformity is not sufficient only with one or two detection and correction operations, with the result that a large number of detecting and correcting operations have to be carried out.

SUMMARY OF THE INVENTION

Accordingly, it is a principal object of the present invention to provide an image recording apparatus with which the recording operation is carried out at all times with good tone reproducibility irrespective of the variation in the tone reproducibility of the recording head and irrespective of the time of use.

It is another object of the present invention to provide an image recording apparatus in which the image quality is improved and stabilized irrespective of the variation in the tone reproducibility of the recording head and the time of use.

It is a further object of the present invention to provide an image recording apparatus capable of effecting good recording without density non-uniformity irrespective of the variation in the tone reproducibility of the recording head and the time of use.

It is a further object of the present invention to provide an image recording apparatus in which even if the density non-uniformity of the recording head changes with use, the density non-uniformity can be corrected quickly.

According to an aspect of the present invention, there is provided an image recording apparatus using a recording head, comprising: tone correcting means for correcting an image signal to be supplied to the recording head to match the signal with tone characteristics of the recording head in accordance with tone correcting information provided particularly for the recording head; and tone correcting information setting means for setting the tone correcting information to said tone correcting means particularly for the recording head.

According to another aspect of the present invention, there is provided an image recording apparatus using a recording head having plural image recording elements, comprising: density non-uniformity correcting means for correcting an image signal to be supplied to the recording head to substantially compensate for density non-uniformity among the plural image recording elements of the recording head; tone correcting means for correcting tone of an image signal to be supplied to the recording head in accordance with tone correcting information provided particularly for the recording head to match the signal with tone characteristics of the recording head; and tone correcting information setting means for setting the tone correcting information to said tone correcting means, particularly for the recording head.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 24 illustrates a tone characteristics correction and a density non-uniformity correction.

DESCRIPTION OF THE PREFERRED EMBODIMENTS

Referring to the accompanying drawings, preferred embodiments of the present invention will be described in conjunction with the accompanying drawings.

Before dealing with the embodiments, the description will be made as to the circuit structure for the tone characteristics correction in a conventional image recording apparatus, referring to FIG. 25.

Figure 25:
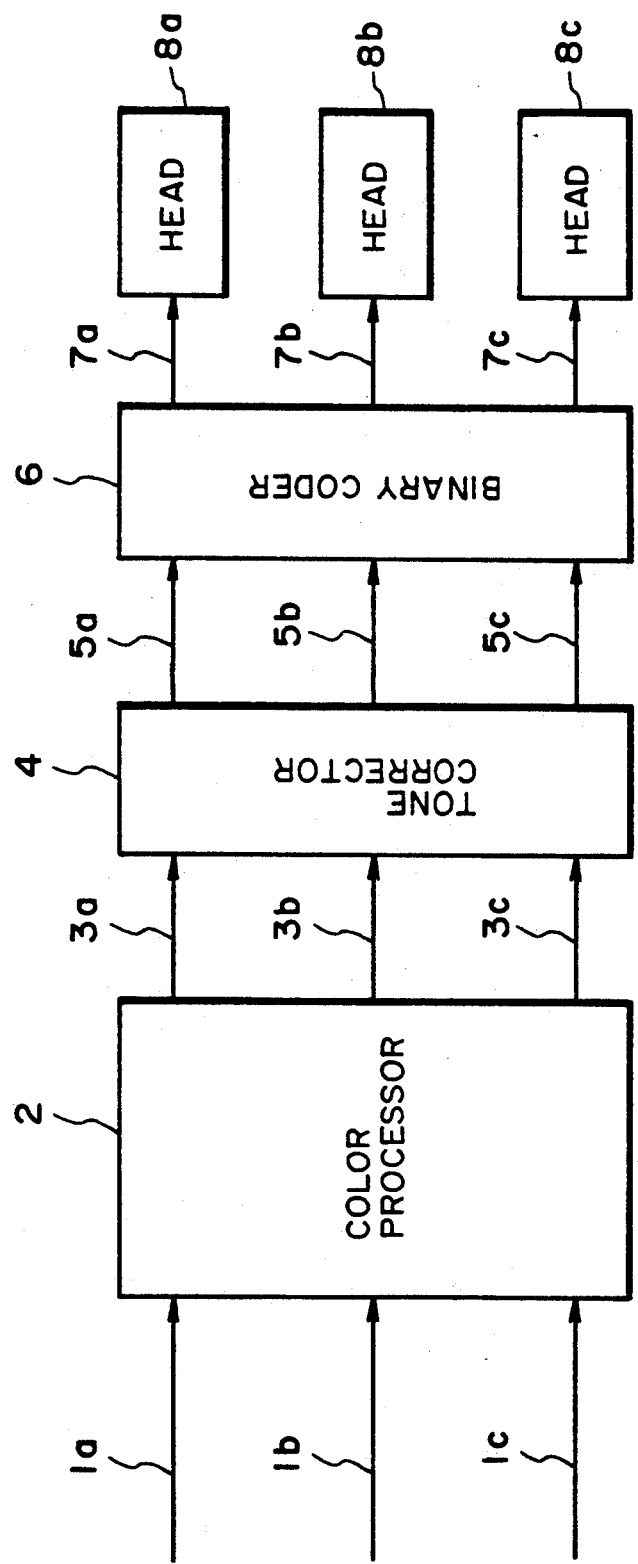
FIG. 25 is a block diagram of a circuit used in a conventional image recording apparatus.

In FIG. 25, input signals 1a, 1b and 1c for the cyan (C), magenta (M) and yellow (Y) components are subjected to a color correcting process such as masking or the like by a color processor 2. Thereafter, the processed signals 3a, 3b and 3c are subjected to a tone characteristics correction by a tone corrector 4 to correct the tone characteristics of the recording head. The multi-level-signals 5a, 5b and 5c provided after the tone correction, are converted to binary level signals by a binary coding processor 6 using a dither method or error dispersion method. The three color signals 7a, 7b and 7c after being binary-coded, are supplied to the respective color (cyan, magenta and yellow) recording head 8a, 8b and 8c. The recording heads 8a, 8b and 8c record a color image on recording paper in accordance with the input signals 7a, 7b and 7c.

Figure 26:
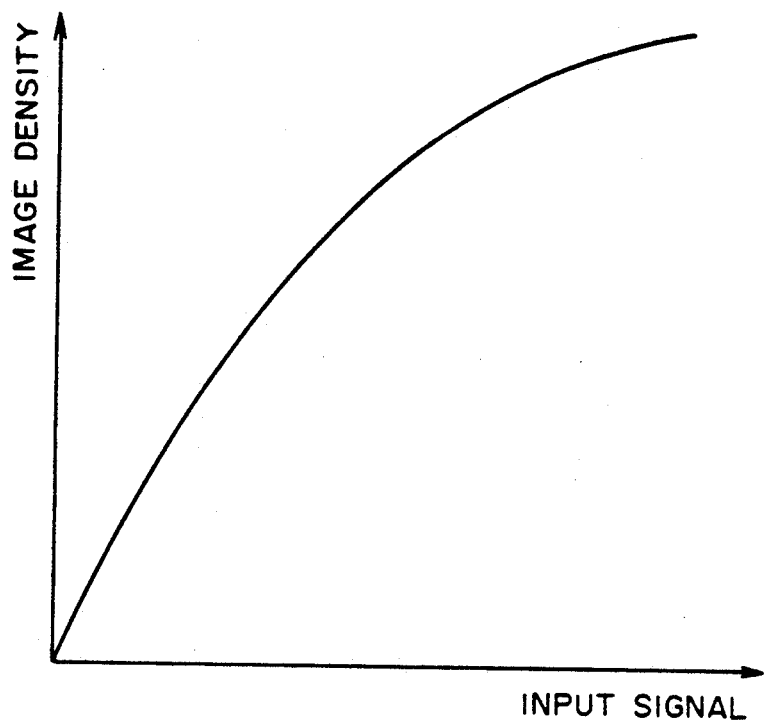
FIGS. 26 to 28 illustrate tone characteristics correction.
Figure 27:
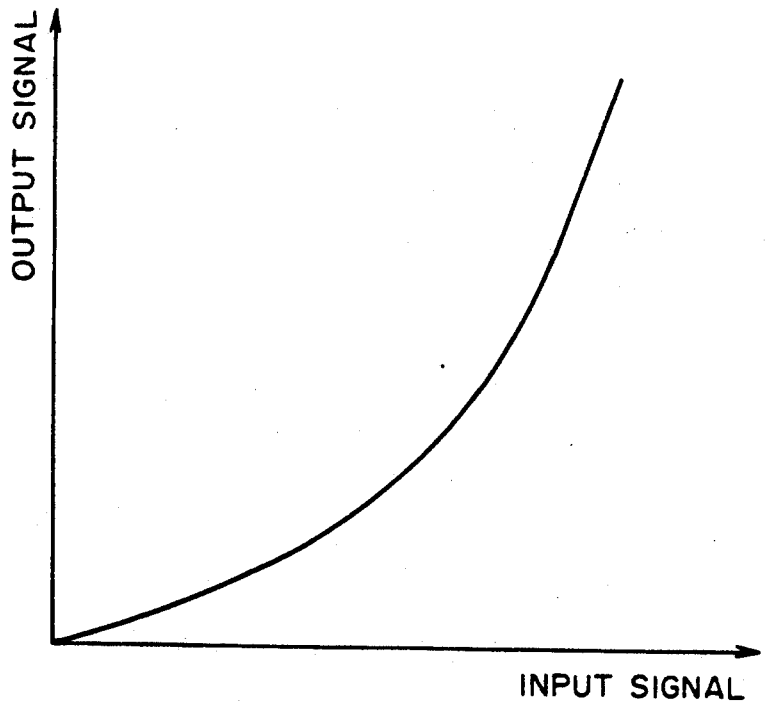
Figure 28:
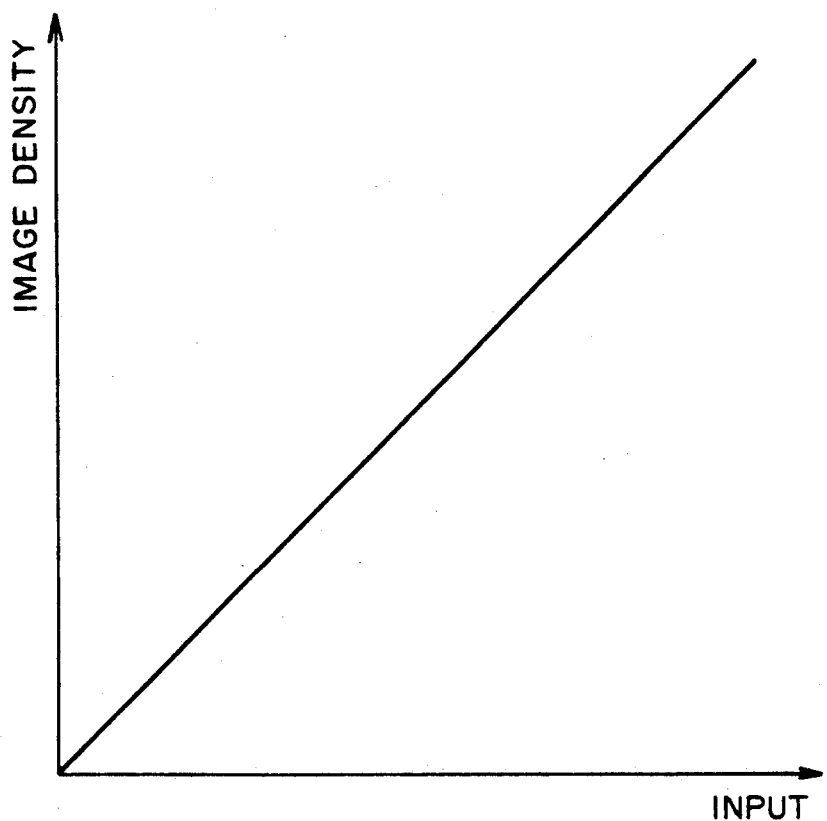
Figure 29:
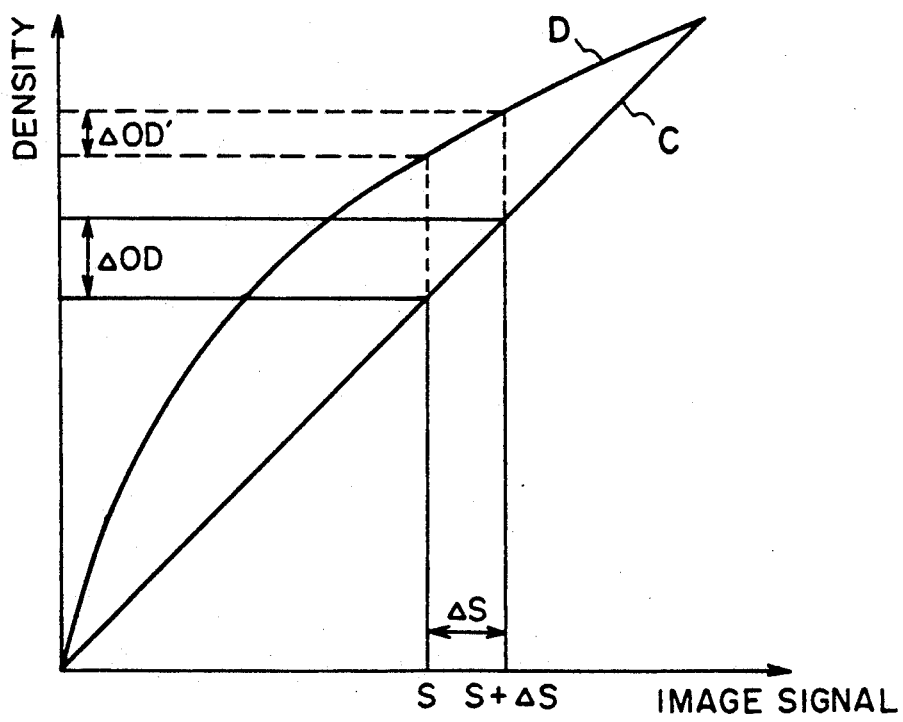
FIG. 29 illustrates a density non-uniformity correction when a density non-uniformity distribution changes.

It is assumed that the recording heads 8a, 8b and 8c have the tone characteristics (reproducibility) as shown by the curve of FIG. 26. It will be understood that the tone is saturated at the high density portion with the result of poor image quality. Therefore, the tone corrector 4 imposes correction to the input signal in accordance with the tone correcting curve shown in FIG. 27, by which the tone characteristics of each of the recording heads 8a, 8b and 8c for each of the input signals 1a, 1b and 1c are changed to have an ideal linearity as shown in FIG. 28, and therefore, a good image with good tone reproducibility can be obtained.

However, with this structure, the tone correcting curve is fixed, and therefore, it is not possible to effect the optimum tone correction for all of the recording heads.

Embodiment 1

Figure 1:
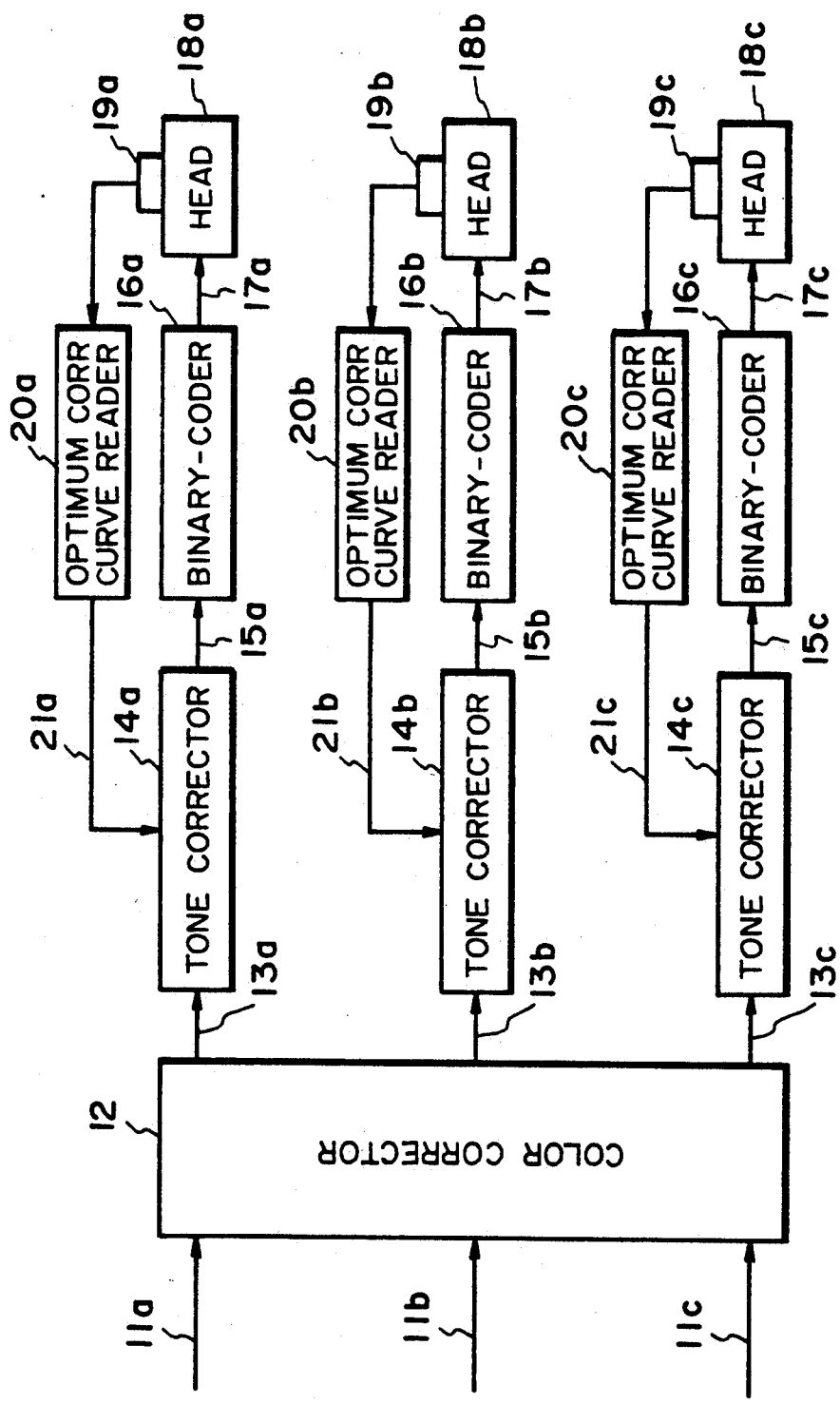
FIG. 1 is a block diagram of a circuit used in an image recording apparatus according to a first embodiment of the present invention.
Figure 2:
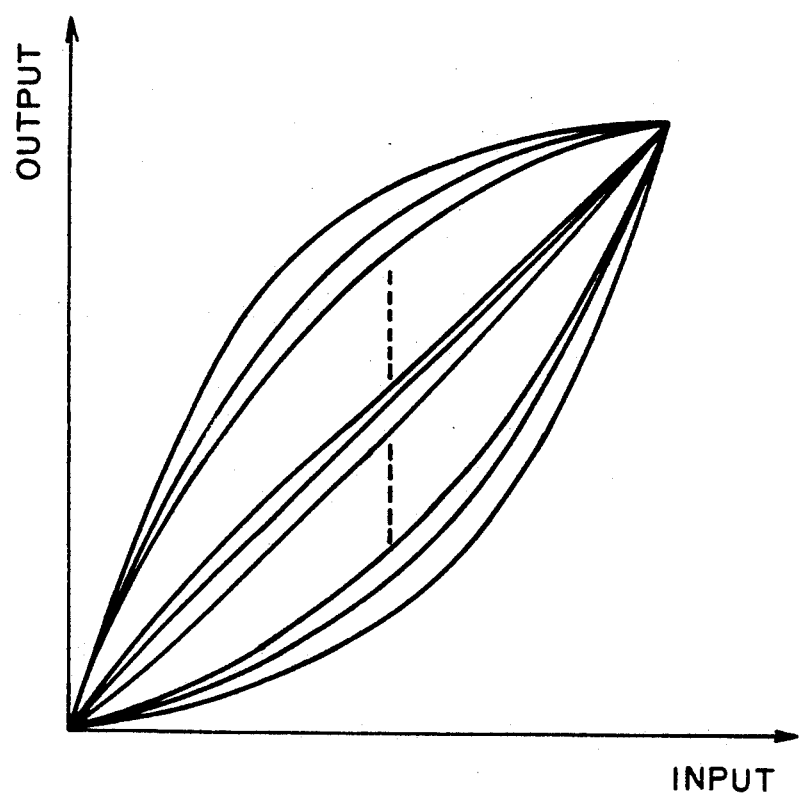
FIG. 2 is a graph showing an example of the tone correcting curve used in the embodiment of the present invention.

Referring now to FIG. 1, there is illustrated a first embodiment of the present invention to provided a solution to the above-described problems with the conventional image recording apparatus.

In this Figure, reference numerals 11a, 11b and 11c designate input image signals for the cyan, magenta and yellow components, respectively. The apparatus comprises a color corrector 12 for effecting color correction processing such as masking or the like to the input signals 11a, 11b and 11c to produce color-corrected image signals 13a, 13b and 13c, and tone correctors 14a, 14b and 14c for correcting the tone characteristics of the recording head to the image signals 13a, 13b and 13c to produce tone-corrected image signals 15a, 15b and 15c. The apparatus further comprises binary coders 16a, 16b and 16c for converting the tone-corrected image signals 15a, 15b and 15c by the dithering method or error dispersion method or the like to produce binary level signals 17a, 17b and 17c, and cyan, magenta and yellow recording heads for effecting color image recording in accordance with binary level image signals 17a, 17b and 17c.

Information displays 19a, 19b and 19c are provided on each of the recording heads 18a, 18b and 18c to represent optimum tone characteristics correcting curves, respectively. The displays or indexes 19a, 19b and 19c may be in the form of data in a ROM, a variable resistance, a mark, a bar-code, a notch or the like. Readers 20a, 20b and 20c read the information of the optimum tone characteristics correcting curve information of the indexes 19a, 19b and 19c. The readers 20a, 20b and 20c may be a memory reading circuit type, an optical type (a photocoupler, for example), a mechanical type (microswitch, for example), a magnetic type (magnetic sensor, for example) or the like. The readers 20a, 20b and 20c produce correcting curve selection signals 21a, 21b and 21c, which are supplied to the tone characteristics correctors 14a, 14b and 14c.

In operation, the input signals 11a, 11b and 11c for the cyan, magenta and yellow color components supplied to the apparatus, are subjected to the color correcting process such as masking or the like by the color corrector 12, and are thereafter supplied into the tone correctors 14a, 14b and 14c. The tone correctors 14a, 14b and 14c, have a ROM (read only memory, storing a plurality of (20, for example) tone correcting curves having different curvatures, which are selected in accordance with reading addresses on the basis of the input signal.

The indexes 19a, 19b and 19c having information indicative of the optimum tone correcting curves for the respective recording heads 18a, 18b and 18c carry the levels corresponding to the optimum correcting curves (curve selecting number) in accordance with the tone characteristics of the respective recording heads in the form of data in the ROM or a resistance of a variable resistor. The levels are preset when the heads are distributed from the factory. The optimum tone characteristics correcting curve information readers 20a, 20b and 20c read the set levels, and control signals (correcting curve selection signals) 21a, 21b and 21c in accordance with the detected levels are supplied to the addresses of the ROM of the tone characteristics correctors 14a, 14b and 14c so as to select the optimum correcting curve. The ROMs of the tone characteristics correctors 14a, 14b and 14c produce tone-characteristic corrected signals using reading signals provided by combination of the signals 21a, 21b and 21c and the input signals 13a, 13b and 13c as the upper address and the lower address, respectively.

As a result, the image signals 13a, 13b and 13c are subjected to proper tone correction at all times in accordance with the tone characteristics of the recording head in the tone correctors 14a, 14b and 14c.

The tone corrected signals 15a, 15b and 15c are converted to two level signals by the binary coding processors 16a, 16b and 16c using a dither method or an error dispersion method, and thereafter are supplied to the recording heads 18a, 18b and 18c, respectively, so as to effect the color image recording.

As described in the foregoing, according to the present invention, the tone correction is possible with the optimum correcting curves matching the tone characteristics of the respective recording heads. Therefore, color images can be provided at all times with good tone reproducibility and with good color balance.

Particularly when the present invention is used in an image recording apparatus wherein the recording head is exchangeable as in a cassette type ink jet printer, the tone reproducibility is always maintained good even if the recording heads are changed.

Embodiment 2

Figure 3:
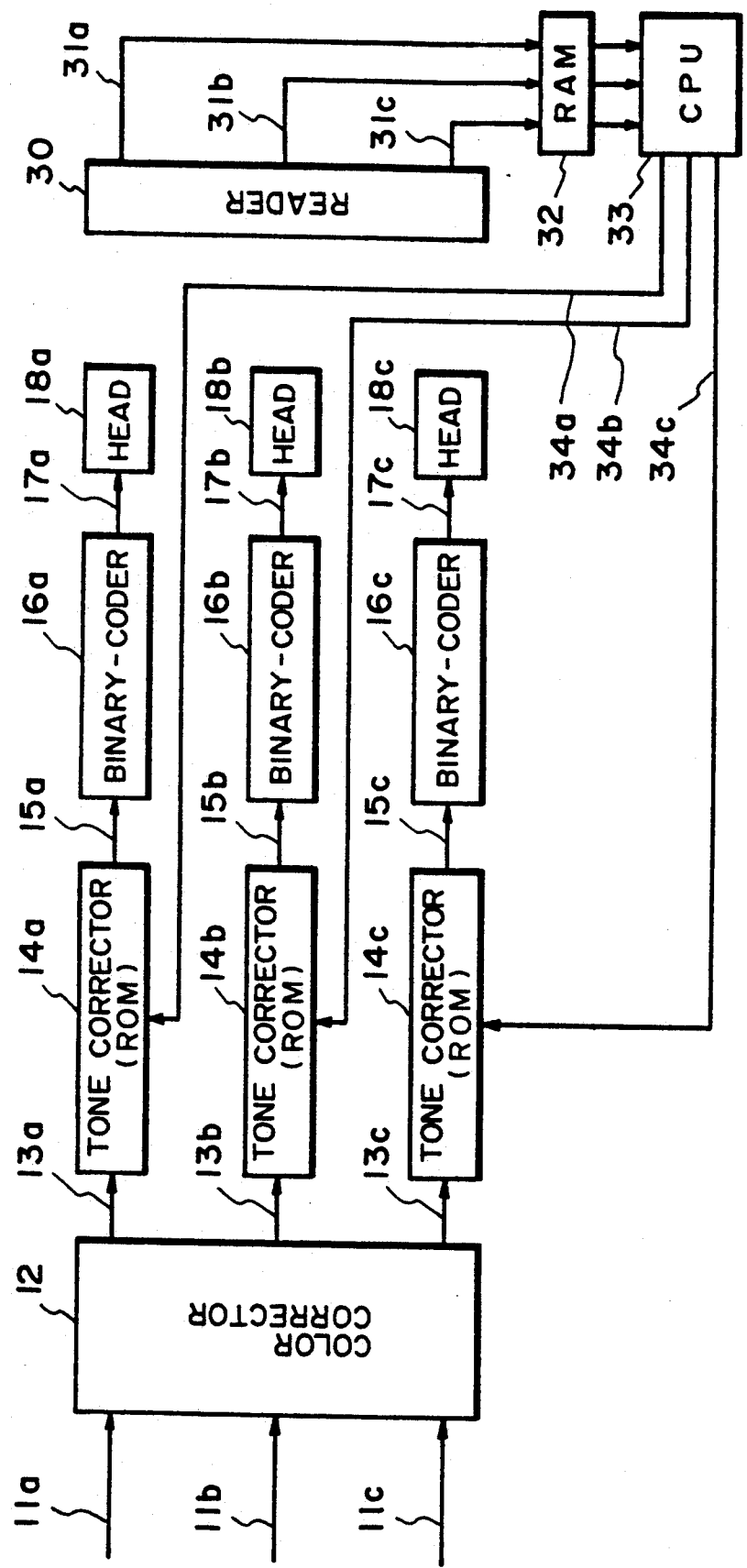
FIG. 3 is a block diagram of a circuit used in an image recording apparatus according to a second embodiment of the present invention.

FIG. 3 shows the circuit structure used in a second embodiment of the present invention. The same reference numerals as in FIG. 1 are assigned to the elements having the corresponding functions, and the detailed descriptions thereof are omitted for simplicity.

In FIG. 3, reference numeral 30 designates an image reader having a solid state image pickup element such as CCD (charge coupled device) to read tone (density) of three colors, red, green, blue, recorded on recording paper on recording heads 18a, 18b and 18c. Reference numerals 31a, 31b and 31c represent read signals for the red, green and blue colors produced from the image reader 30. A RAM (random access memory) stores the read signals 31a, 31b and 31c. A CPU (central processing unit) 33 performs a predetermined processing on the basis of the output signal from the RAM 32. References 34a, 34b and 34c designate correcting curve selection signals produced by the CPU 33. The correcting curve selecting signals 34a, 34b and 34c are supplied to the tone correctors 14a, 14b and 14c.

Figure 4:
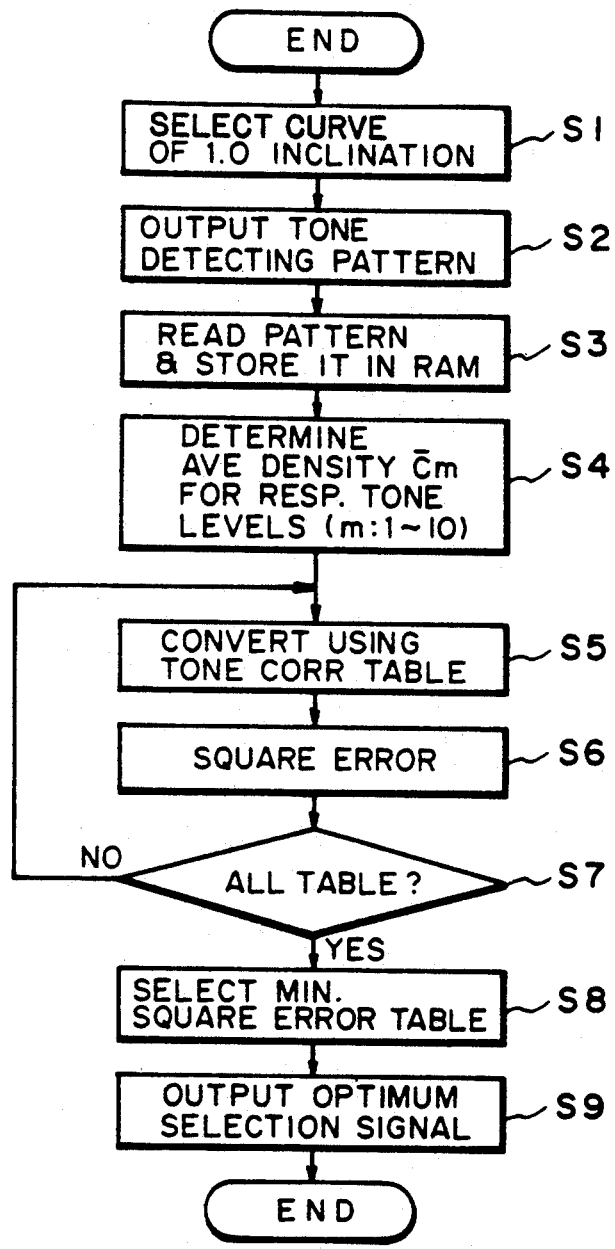
FIG. 4 is a flow chart showing the control steps in an image recording apparatus according to a second embodiment of the present invention.

Referring to FIG. 4 (flow chart), the control operation of the CPU 33 in this embodiment will be described.

Figure 5:
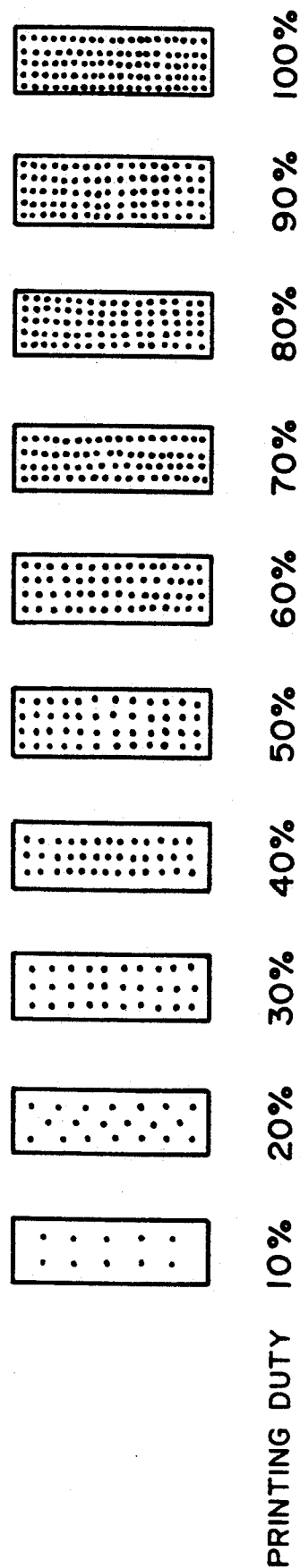
FIG. 5 shows an example of a test pattern (tone characteristics measuring pattern) used in the recording apparatus according to the second embodiment.

First, the correction curve selecting signal 14a, 14b and 14c select a line having an inclination of 1.0 (at step S1). Then, in response to a signal from a tone characteristics detecting pattern generator (not shown), the recording heads 18a, 18b and 18c record on the recording sheet predetermined tone characteristic detecting pattern, at step S2. An example of the tone characteristics detecting pattern is shown in FIG. 5. As will be understood, it comprises plural patterns having different tone levels, and the record duty (percentage of the record) for each color changes from 10-100% (solid) with increment of 10%, and therefore, at 10 steps.

Subsequently, the image reader 30 reads the output pattern, and the read signals for the respective tones are stored in the RAM 32 (at step S3). Then, the read signals from the RAM 32 are converted to densities and averaged to provide average densities $\overline{C}m(m=1-10)$ for the respective tone levels (step S4). The average density $\overline{C}m$ is converted using a tone correcting table stored in the RAM of the CPU 33 (at step S5). Then, the error square between the tone levels provided by the table conversion and the ideal line is calculated, at step S6. That is, $$E = \sum_{m=1}^{10} (\overline{C}'m - Com)^2$$

where the average density for each of the tone levels after the table conversion is $\overline{C}'m$ (m=1−10), and the value of the ideal line is Com, and E is the error square.

Then, the description is made at step S7 as to whether the calculations are performed for all of 20 tone correcting curves. If not, the step S5 is executed. If so, a tone correcting curve providing minimum error square is obtained, at step S8. On the basis of the discrimination, selection signals 34a, 34b and 34c indicative of the optimum tone correcting curves are supplied to the tone correctors 14a, 14b and 14c, respectively, at step S9.

By doing so, even if the tone reproducing characteristics of the recording heads 18a, 18b and 18c change with time of use, the optimum tone correcting curves are selected at all times, and therefore, the good image quality can be maintained.

In this embodiment, the reading operation for the correcting pattern recorded on the recording sheet may be carried out by the user or a serviceman. At this time, the record output of the pattern may be placed on the reader. It is a possible alternative that a dedicated reader sensor may be provided on a recording sheet conveying passage, so that the sensor automatically reads the output pattern.

Embodiment 3

In this embodiment, the tone characteristics of the recording heads are actually measured in the apparatus, and on the basis of the results of the measurement, optimum correcting curves are produced by the CPU, and the correcting curves thus obtained are used.

Figure 6:
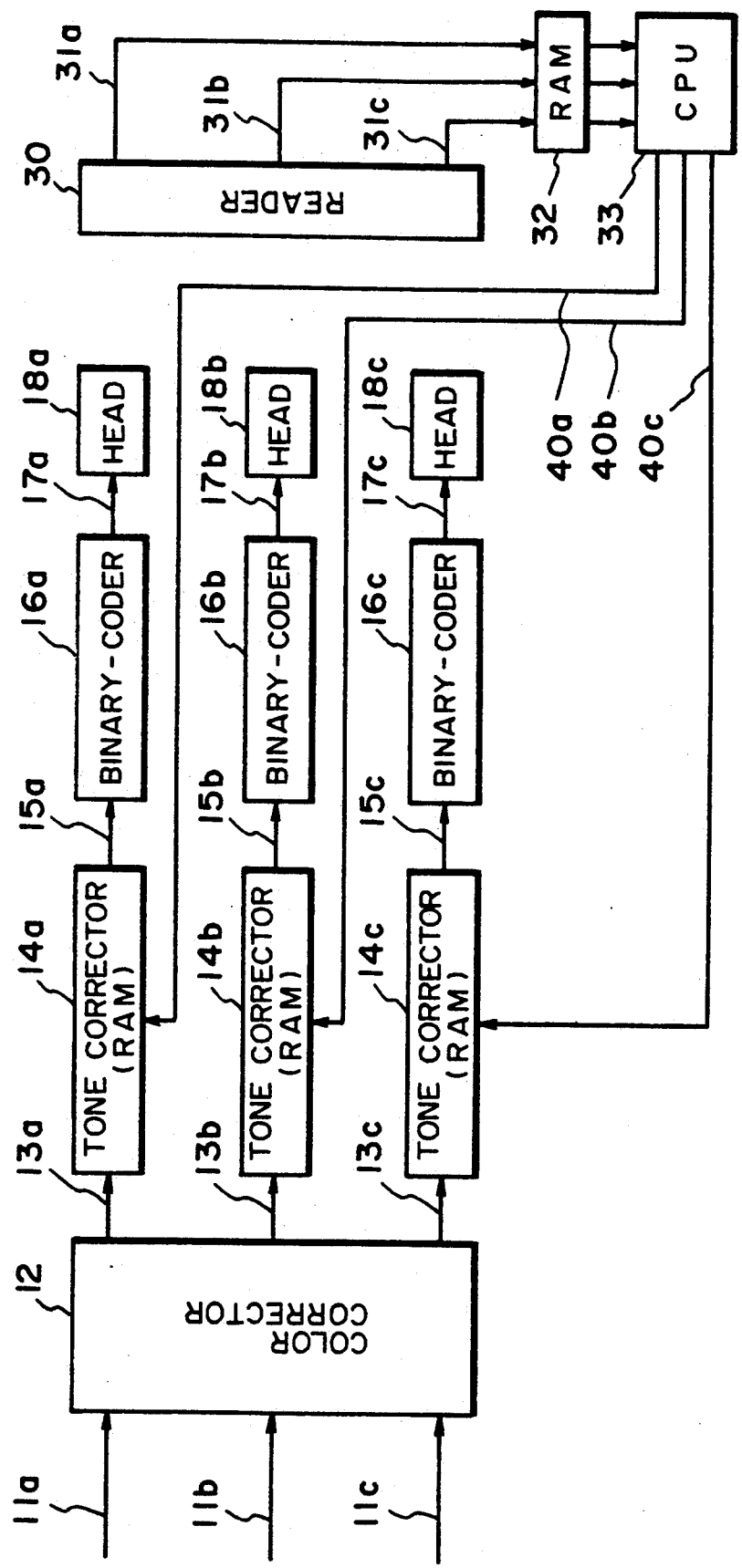
FIG. 6 is a block diagram of a circuit used in an image recording apparatus according to a third embodiment of the present invention.

FIG. 6 shows the structure of the circuit used in this embodiment. In this embodiment, the tone correctors 14a, 14b and 14c comprise RAMs rather than ROMS. Reference numerals 40a, 40b and 40c are not correcting curve selecting signals but are the data of the correcting curve. They are the points in which this embodiment is different from the second embodiment.

Figure 7:
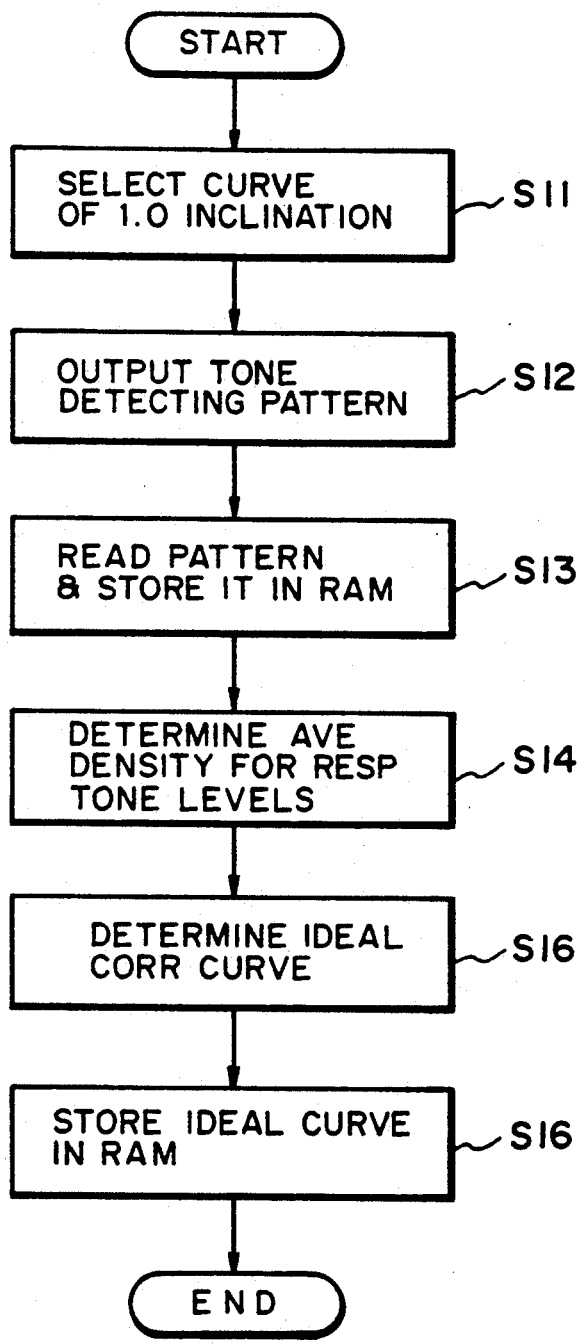
FIG. 7 is a flow chart showing control steps in the apparatus according to the third embodiment of the present invention.

Referring to FIG. 7 (flow chart), the process steps in this embodiment will be described. The steps S11-S14 are the same as the steps S1-S4 of the above-described second embodiment. At step S15, the ideal tone correcting curve is calculated out on the basis of the average density $\overline{C}m$ for the respective tone levels obtained by the measurement.

At step S16, the data 40a, 40b and 40c for the ideal correcting curves provided by the calculation are stored in the RAM of the tone correctors 14a, 14b and 14c.

By doing so, the tone correction becomes optimum at all times for the recording heads having any tone characteristics.

In this embodiment, the indexes 19a, 19b and 19c indicative of the information relating to the optimum tone correcting curves of FIG. 1 are in the form of a ROM or a variable resistor. They may be in the form of switches having plural stages. In another alternative, pit and projection configurations formed at parts of the recording heads 18a, 18b and 18c are changed in accordance with the optimum curves. When they are engaged with the recording apparatus, a microswitch or a photocoupler produces a control signal in accordance with the configuration. The indexes 19a, 19b and 19c are not necessarily integral with the recording heads. For example, a separate ROM storing the tone correcting curve information may be prepared, for example, and the ROM is also mounted in the apparatus when the recording head is mounted.

In the foregoing embodiments, the description has been made in the case of the color image recording apparatus for providing a color image using cyan, magenta and yellow. However, the present invention is applicable to a monochromatic image recording apparatus with the same advantageous effects.

Embodiment 4

Now, an embodiment will be described wherein a density non-uniformity is corrected. Before describing the embodiment, a brief description will be made as to the density non-uniformity correction.

Figure 8:
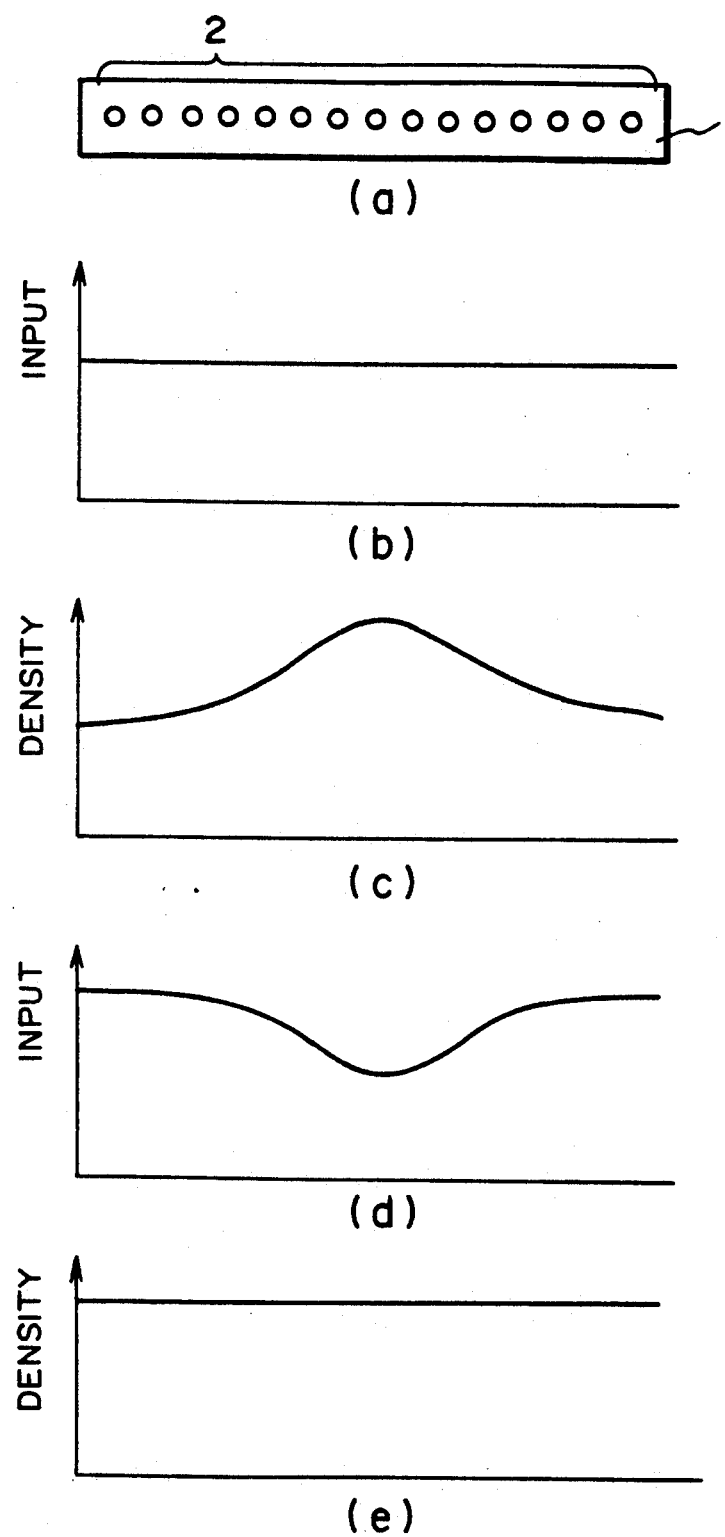
FIG. 8 illustrates a density non-uniformity correcting method.

Referring to FIG. 8A, recording elements 2 are disposed in a line (multi-type head 1). When the input signals having uniform levels (FIG. 8B) are supplied to the image recording elements, the density non-uniformity occurs as shown in FIG. 8C. The input signals are corrected as shown in FIG. 8D, so that the large input is supplied to the low density recording elements, whereas the smaller input is supplied to the high density recording elements. By doing so, the density distribution is made uniform as shown in FIG. 8E.

Figure 9:
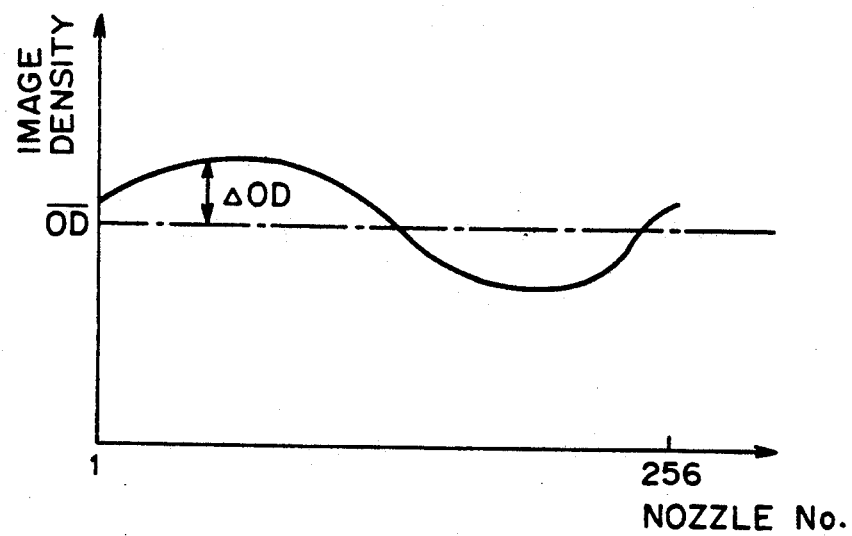
FIG. 9 shows an example of the density non-uniformity.

An example of the obtaining the correction amount is as follows. A multi-type head having 256 nozzles is taken as an example. When the recording is effected with a uniform level image signal S, the density non-uniformity distribution is as shown in FIG. 9. An average density OD of the recorded images by the 256 nozzles are obtained.

(1) An average density OD of the record by 256 nozzles is obtained.

(2) The image densities OD1–OD256 are measured for the respective nozzles.

(3) $\Delta OD_n = OD - OD_n$ (n=1-256).

Figure 10:
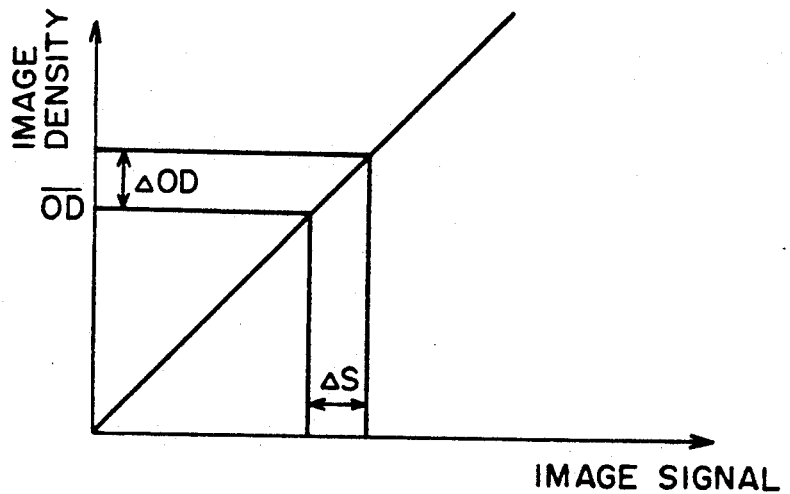
FIG. 10 shows an example of a relation between the image signal and the image density.

When the relation between the image signal and the output density, that is, tone characteristics, are as shown in FIG. 10, the image signal is corrected by the amount $\Delta S$ in order to correct the density by $\Delta OD_n$. In order to do this, the image signal is table-converted on the basis of the characteristics shown in FIG. 11.

Figure 11:
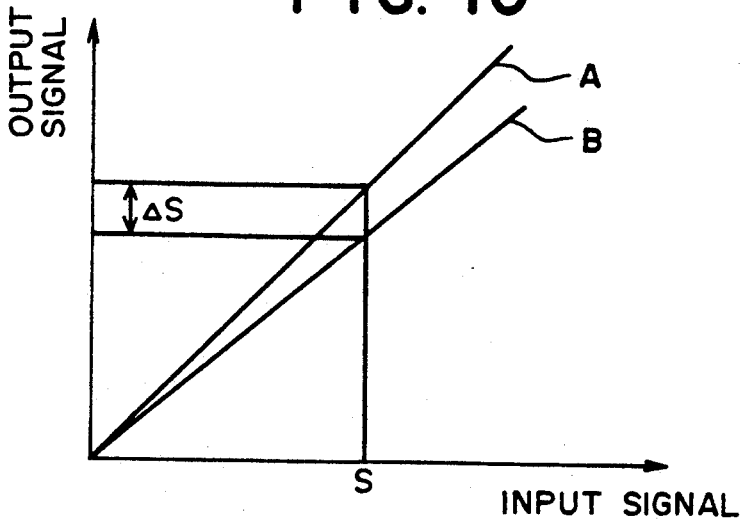
FIG. 11 illustrates the correction of the density non-uniformity.

The line A of FIG. 11 has the inclination of 1.0, and therefore, the input is outputted as it is without any conversion. On the other hand, the line B has a smaller inclination than the line A, and therefore, when the input signal S is supplied, the output signal is $S - \Delta S$. Therefore, to the image signal supplied to the n-th nozzle, the table-conversion is effected using the line B of FIG. 11, and then, is supplied to the recording head to drive it, by which the density of the print provided by the nozzle is equal to OD.

By effecting such processing to all the nozzles, the density non-uniformity is corrected so that a uniform image can be provided. In another words, the density non-uniformity can be corrected if the data of table conversion for the nozzles are predetermined.

However, due to the differences among tone characteristics of the individual recording heads, the correction is not sufficient by a single operation of reading the density non-uniformity ana producing the correcting data.

When the tone characteristics of the recording head are as shown by line C, and if a density difference $\Delta OD$ exists in the case of the image signal S, the density difference $\Delta OD$ can be removed by correcting the image signal by the predetermined amount $\Delta S$. However, when the tone characteristics of the recording head are as shown by the curve D, and when the correction of the predetermined amount $\Delta S$ is imposed on the basis of the detection of the difference $\Delta OD$, the actually effected amount of correction is only $\Delta OD'$, and therefore, the uniform image can be provided only by a single correcting operation.

The fourth embodiment is aimed at the correction of the density non-uniformity in a short period.

Figure 12:
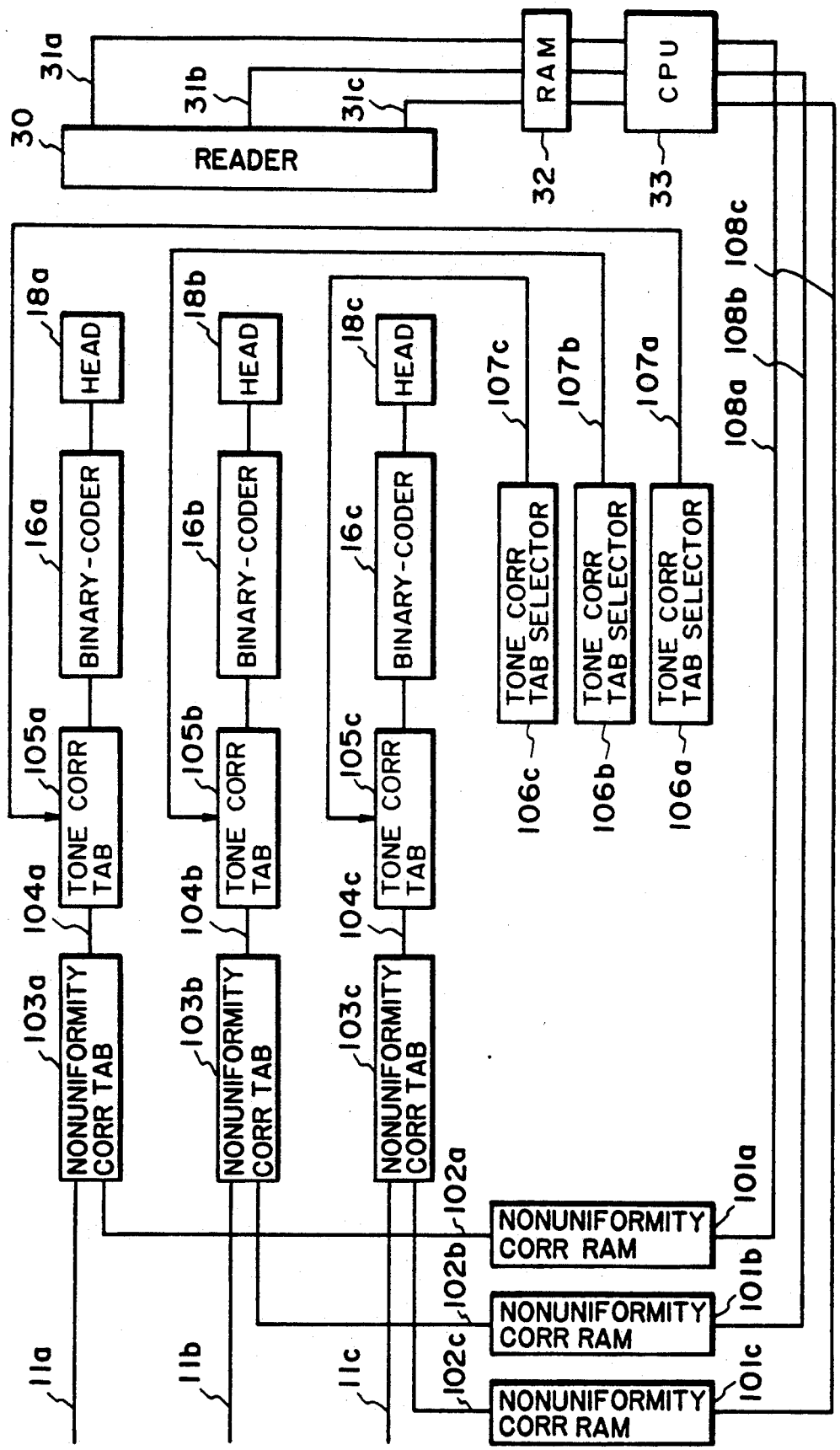
FIG. 12 is a block diagram of a circuit used in a fourth embodiment of the present invention.

Referring to FIG. 12, there is shown the fourth embodiment. The apparatus comprises non-uniformity correcting RAMs 101a, 101b and 101c and store selection signals for the correcting lines required for correcting the density non-uniformity of the recording head. That is, they store correcting signals having 61 levels (0–60) for 256 nozzles. In synchronism with the input signals, non-uniformity correcting signals 102a, 102b and 102c are produced.

Figure 13:
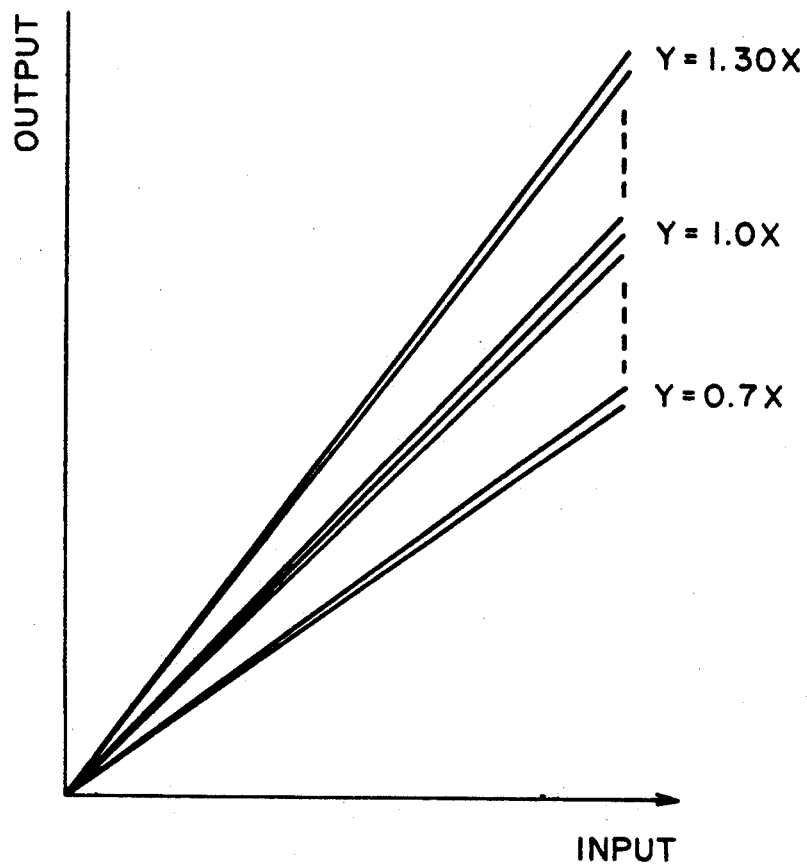
FIG. 13 shows an example of the density non-uniformity correcting curve.

Non-uniformity correcting tables 103a, 103b and 103c (density non-uniformity correcting means) effect conversion of the image signals 11a, 11b and 11c to correct the non-uniformity of the recording heads 18a, 18b and 18c. As shown in FIG. 13, there are 61 correcting lines from Y=0.70X to Y=1.30X with the increment of 0.01 inclination. In accordance with the non-uniformity correcting signals 102a, 102b and 102c, the correcting curves are switched. For example, when a picture element signal is supplied to the nozzle providing a large dot diameter, the smaller inclination correcting curve is selected, and when it is supplied to the nozzle providing a smaller diameter dot, the larger inclination correcting line is selected, so as to properly correct the image signal.

The tone correcting tables 105a, 105b and 105c (tone correcting means) have ROM's storing 20 tone correcting curves having different profiles. The optimum tone correcting table for each of the recording heads is determined on the basis of test after manufacturing the recording head, and is marked or labeled on the corresponding head.

Tone correcting table selectors 106a, 106b and 106c (input means) function to select by software from the operation panel the optimum tone correcting curve for each of the heads or to select by switches on the electric board.

Binary coding circuits 16a, 16b and 16c functions to convert the signals corrected by the tone correcting table 105 to two level signals by the dithering or error dispersion method. Designated by reference numerals 18a, 18b and 18c are ink jet heads having 256 nozzles for each color.

A reader 30 (reading means), has a CCD element with red (R) green (G) and blue (B) filters, and the CCD element has the same density 400 dpi as the recording density of the head. The number of picture elements of the CCD is larger than the number of nozzles of the recording head, that is, larger than 256. A RAM 32 stores the read signals 31a, 31b and 31c from the reader 30. The CPU 33 processes the corrected data in accordance with the R, G and B signals from the RAM 32.

Designated by references 11a, 11b and 11c are image signals of three colors, i.e., cyan, magenta and yellow color; 104a, 104b and 104c are image signals after non-uniformity correction for the respective colors; 31a, 31b and 31c are read signals from the reader 30 for the respective colors R, G and B; 108a, 108b and 108c are non-uniformity correcting data for the cyan, magenta and yellow colors; and 102a, 102b and 102c are non-uniformity correcting signals for the respective colors.

In operation, the image signals 11a, 11b and 11c are converted by the non-uniformity correcting table 103a, 103b and 103c in the direction of reducing the non-uniformity peculiar to the recording heads 18a, 18b and 18c. In synchronism with the input image signals, non-uniformity correcting signals 102a, 102b and 102c are produced. The non-uniformity corrected signals 104a, 104b and 104c from which the non-uniformity is removed by $\gamma$ lines selected by the non-uniformity correcting signals 102a, 102b and 102c are supplied to the tone correcting tables 105a, 105b and 105c, and the tone characteristics of the recording heads 18a, 18b and 18c are corrected by the tone correcting tables 105a, 105b and 105c, and the corrected signals are outputted.

In this embodiment, the optimum tone correcting table for each of the recording heads is determined on the basis of the characteristics test after the manufacturing of the recording head, and the results are marked or labeled on the corresponding head. When the recording head is mounted, the operator looks at the label or marking, and selects the tone correcting selection signal by the correcting table selectors 106a, 106b and 106c as an address of the tone correcting table, thus selecting the proper table.

Figure 14:
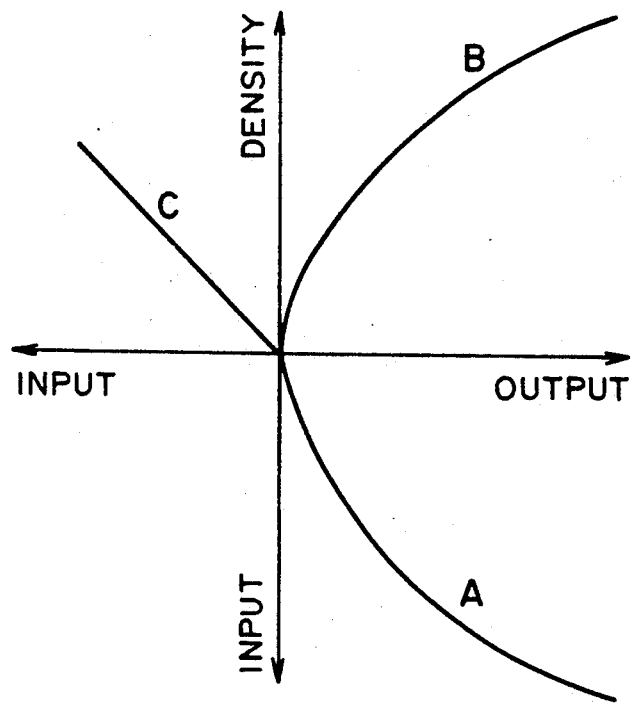
FIGS. 14 and 15 illustrate tone characteristics correction.
Figure 15:
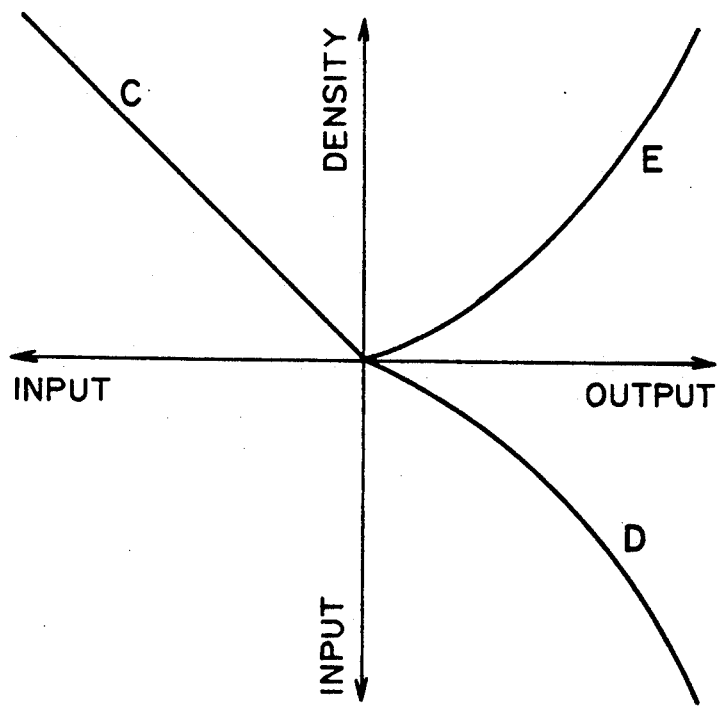

When the tone characteristics of the recording head are as shown by a curve B of FIG. 14, the tone correcting table of curve A is selected so that the relation between the input signal and the image density is as indicated by the line C. When the tone characteristics of the recording head are as shown by a curve E of FIG. 15, a table of curve D is selected so that the linear tone as indicated by the line C is obtained. In this manner, the optimum tone correcting table for the recording head is selected, by which the relation between the input signal and the image density is on the same line at all times.

The signal corrected in this manner is binary-coded coded by binary coding circuits 16a, 16b and 16c using the dithering or error dispersion method or the like. On the basis of the signals from the circuit 16a, 16b and 16c, the multi-nozzle ink jet recording heads 18a, 18b and 18c are driven. As a result, the number of dots from the nozzle providing a larger dot size is small, and the number of dots from the nozzle providing a smaller size is larger, so that a uniform image can be provided.

Figure 16:
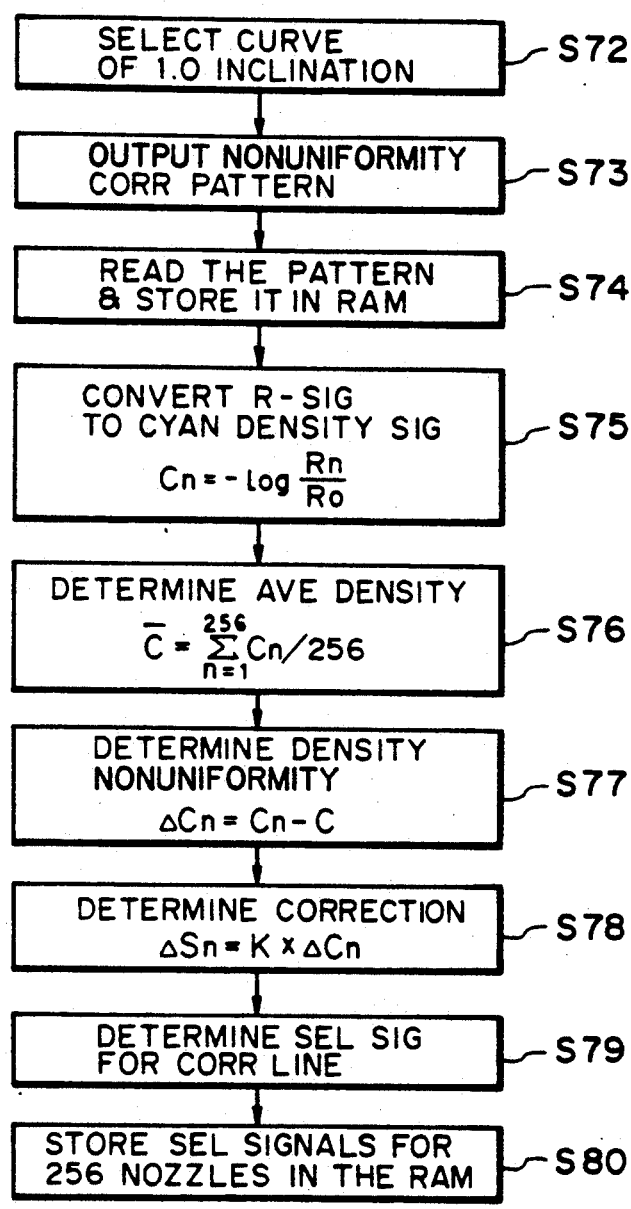
FIG. 16 is a flow chart showing the density non-uniformity correcting steps used in a fourth embodiment of the present invention.

FIG. 16 shows a flow chart illustrating the density non-uniformity correcting steps performed by the CPU 33 shown in FIG. 12.

At step S72, in response to an unshown control signal, a line having an inclination of 1.0 is selected for all of the correcting tables 103a, 103b and 103c, so that the non-correction function is established. Subsequently, at step S73, a correction pattern is outputted from an unshown signal source, so that a non-uniformity correcting pattern is printed by the recording heads 18a, 18b and 18c. The correcting pattern may be a uniform pattern having any printing duty. However, the printing duty is preferably 30-75%. In this embodiment, the correcting pattern is a uniform halftone pattern of 50% printing duty in each of cyan, magenta and yellow colors.

At step S74, the pattern produced by the step S73 is read by the reader 30, and the read signals 31a, 31b and 31c for the three colors are stored in the RAM 32. From the red signal, the non-uniformity distribution of the cyan head is obtained; from the green signal, the non-uniformity distribution of the magenta head is obtained; and from the blue signal, the non-uniformity distribution of the yellow head is obtained. Here, the description will be made as to the non-uniformity correction is effected on the basis of the distribution of the non-uniformity of the cyan head, for simplicity.

At step S75, for a red signal Rn (n = 1 − 256) obtained corresponding to the respective nozzles of the cyan recording head, the calculation is effected using the following equation:

$$Cn = -\log(Rn/Ro)$$

Ro is a constant not less than Rn. By doing so, it is converted to a cyan density signal, so that the density non-uniformity distribution can be obtained. At step S76, the average density $\overline{C}$ is obtained by the following equation:

$$\overline{C} = \sum_{n=1}^{256} (Cn/256) \quad (1)$$

At step S77, the deviation of the image density from the average density obtained in the foregoing step is obtained by the following equation:

$$\Delta Cn = Cn - \overline{C} \quad (2)$$

At step S78, the amount of correction corresponding to $\Delta Cn$ is obtained by $\Delta Sn = K \times \Delta Cn$, where K is a constant determined by the tone characteristics of the recording head, but in this embodiment, the optimum coefficient when the tone characteristics correspond to a line is selected.

At step S79, a selection signal for the correcting line to be selected for the $\Delta Sn$ is determined. At step S80, the non-uniformity correcting signals having 0-60 levels are stored in the non-uniformity correcting RAM 101a for 256 nozzles.

Using the correcting data thus provided, the $\gamma$ lines different for the individual nozzles are selected to correct the density non-uniformity. The variation of the tone characteristics of the recording heads are corrected by selecting optimum tone correcting table, and therefore, the optimum correction levels can be obtained, and the density non-uniformity can be corrected in a short period.

In this embodiment, the description has been made with respect to an example of the cyan head, but the density non-uniformity correction can be carried out in a short period through the similar steps for the magenta and yellow recording heads, and therefore, the inoperable period of the machine can be minimized.

The reading operation for the printed correcting pattern may be carried out by the user or a serviceman by setting the output record on the reader.

In an alternative, a printed test pattern may be automatically read by the apparatus.

Embodiment 5

Figure 17:
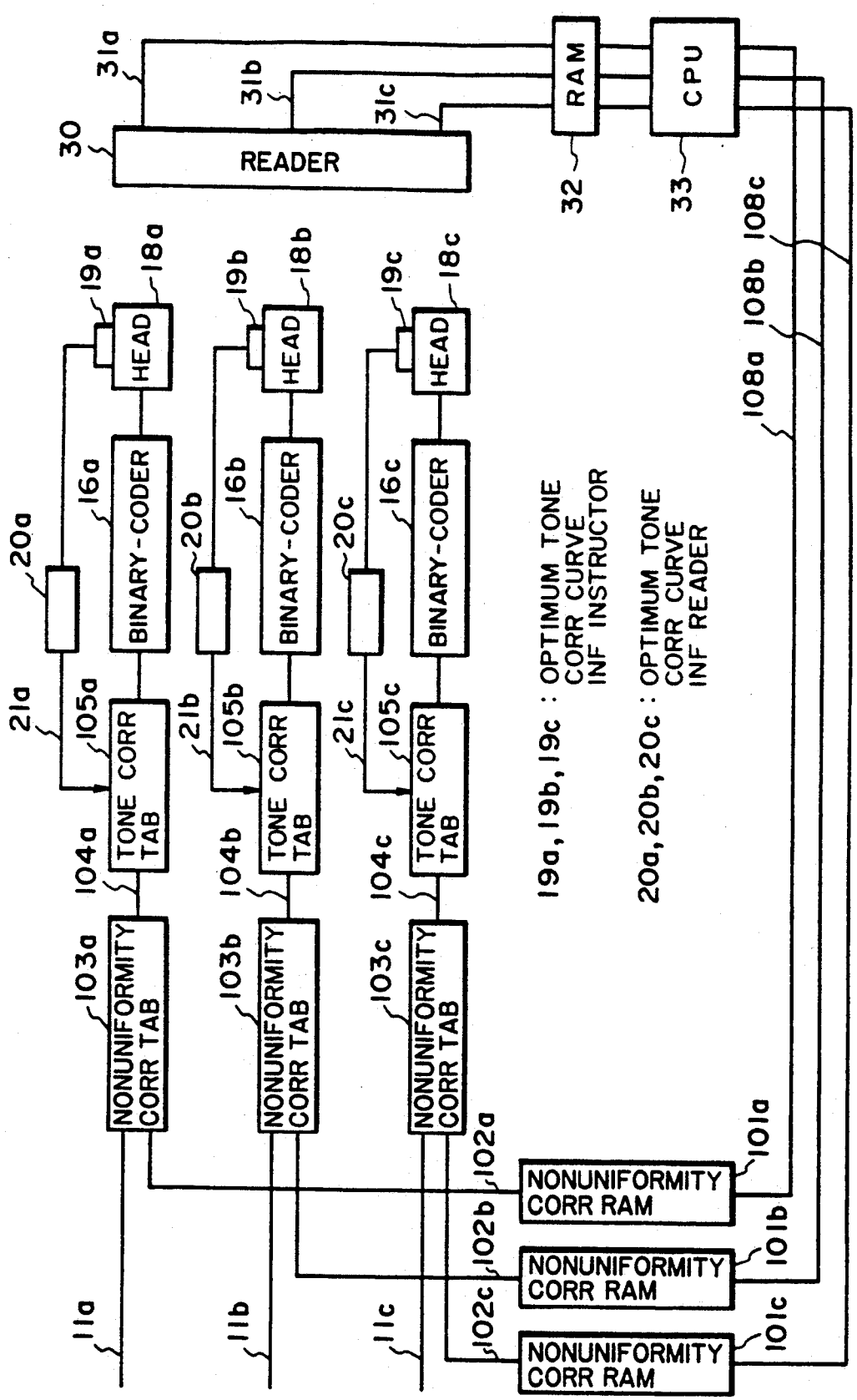
FIG. 17 is a block diagram of a circuit used in an image recording apparatus according to a fifth embodiment of the present invention.

FIG. 17 shows a fifth embodiment. As compared with the fourth embodiment, the input means for the tone correcting information is different. The input means is similar to that of the first embodiment (FIG. 1).

In FIG. 4 embodiment, each of the recording heads is labeled or marked with an optimum tone correcting table. When the recording head is mounted, the operator looks at it, and inputs the tone correction selecting signal to the addresses of the tone correcting table 105 by the tone correcting table selectors 106a, 106b and 106c so as to select the proper table. In this embodiment, the indexes 19a, 19b and 19c of the information indicative of the optimum tone characteristic correcting curve are in the form of data in the ROM or in the form of a resistance of a variable resistor having a level corresponding to the optimum tone correcting curve of each of the recording heads. The readers 20a, 20b and 20c read the information indicative of the optimum curves, and in accordance with the information of the optimum curve thus read, the control signals 21a, 21b and 21c are transmitted to the tone correcting tables 105a, 105b and 105c, so that the optimum tone correcting curves may be automatically set.

Therefore, the advantageous effects of this embodiment is essentially the same as the embodiment of FIG. 4. However, there is an advantage that the operation for setting the optimum tone correcting curve is selected for the respective mountings of the recording heads can be omitted. In this embodiment, the index is in the form of the ROM or the variable resistor, but it may be in the form of a switch having plural stages.

It is a possible alternative that the configuration of a part of the recording head may be changed in accordance with the optimum curve, and a control signal is produced in accordance with the configuration when the recording head is engaged into the recording apparatus.

The index is not necessarily integral with the recording head. For example, a ROM storing the information is prepared separate from the recording head, and the ROM may be simultaneously mounted into the apparatus when the recording head is mounted.

In addition, it is not necessary to effect the density non-uniformity correction for each one of the picture elements, but may be effected for respective blocks, each block being defined as including adjacent plural picture elements.

Embodiment 6

Figure 18:
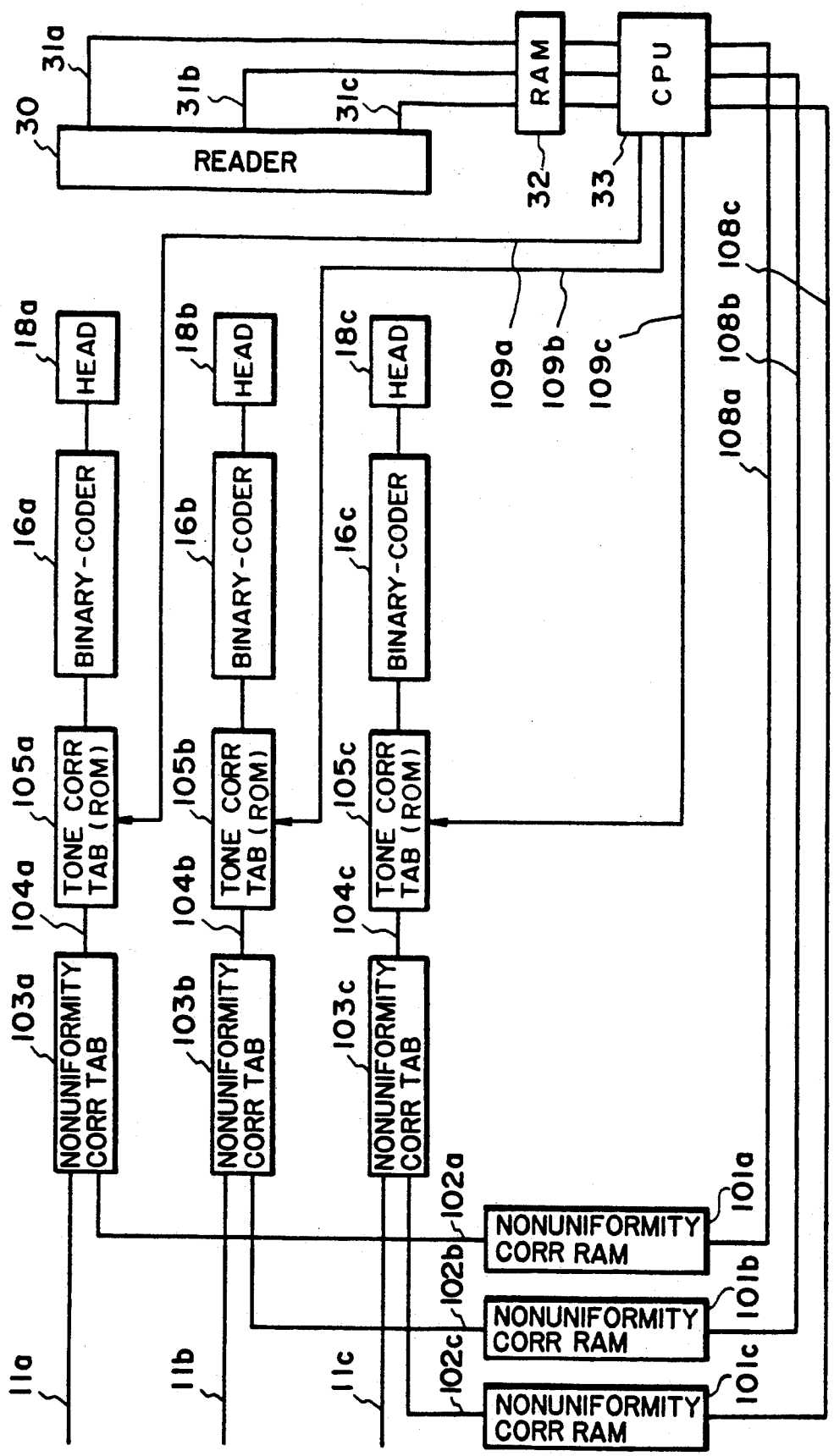
FIG. 18 is a block diagram of a circuit used in an image recording apparatus according to a sixth embodiment of the present invention.

FIG. 18 shows a sixth embodiment.

As compared with the fourth embodiment, the input means for the tone correcting information is different, and the input means in this embodiment is the same as in the second embodiment shown in FIG. 3.

In this embodiment, the tone characteristics of the recording head are detected in the apparatus, and in accordance with the result, the optimum curve is discriminated by the CPU 33. The optimum correcting curve selecting signals 109a, 109b and 109c are supplied to the tone correcting table in accordance with the discrimination, and the optimum tone correcting table is selected. The tone correcting operation by the CPU 33 in this embodiment is similar to that shown in the flow chart of FIG. 4, and therefore, the description is omitted for simplicity.

After the tone correcting operation, the density non-uniformity correcting data are produced as in the fourth embodiment.

By doing so, the non-uniformity correcting data can be produced in a short period even if the tone characteristics are changed with time of use of the recording head, and therefore the inoperative period of the apparatus can be minimized.

Embodiment 7

Figure 19:
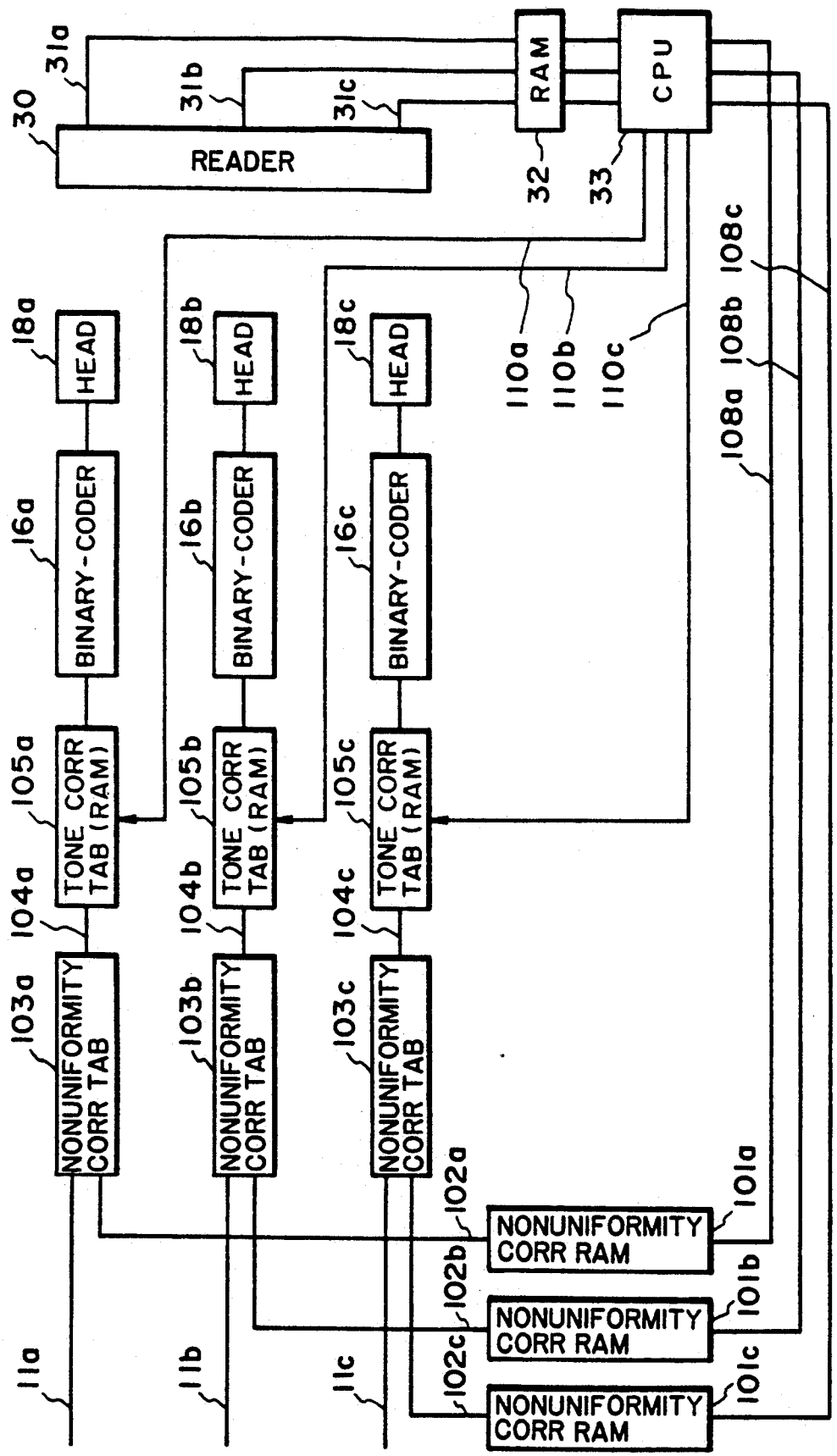
FIG. 19 is a block diagram of a circuit used in an image recording apparatus according to a seventh embodiment of the present invention.

FIG. 19 shows a seventh embodiment.

As compared with the sixth embodiment, the input means for inputting the tone correcting information is different, and the input means of this embodiment is similar to the third embodiment shown in FIG. 6.

In the sixth embodiment, the tone characteristics of the recording head are measured in the apparatus, and in accordance with the result, the optimum curve is discriminated by the CPU 33. The optimum tone correcting curve selecting signals 109a, 109b and 109c are supplied to the tone correcting tables 105a, 105b and 105c at the ROM thereof in accordance with the result of the discrimination so as to permit the selection of the optimum tone correcting table. In this embodiment, the tone characteristics of the recording head are detected in the apparatus, and from the detected densities for the respective tone levels, a proper tone correcting curve is obtained, and the correcting curve data 110a, 110b and 110c obtained by the processing as the proper ones, are stored in the RAM of the tone correcting tables 105a, 105b and 105c. The tone correcting operation by the CPU 33 in this embodiment is similar to that shown in the flow chart of FIG. 7 and therefore, the description thereof is omitted for the simplicity.

After the tone correcting operation, the density non-uniformity correcting data are produced through the similar steps as in the fourth embodiment.

By doing so, the non-uniformity correcting data can be produced in a short period of time for the recording head having any tone characteristics, and therefore, the inoperative period of the machine can be minimized.

In the fourth-seventh embodiments, the description has been as to an jet recording head, however, they are applicable to a thermal head for a thermal transfer type printer.

The multi-nozzle head is not limited to the semi-multi-nozzle head and may be a full-multi-nozzle head having the same width as the width of the image.

As for the method of non-uniformity correction, the number of dots is changed, but the width or the voltage of the driving pulse may be changed to change the area of the dot itself.

In the foregoing, description has been made as to an image recording apparatus for producing a color image using cyan, magenta and yellow colors, but the present invention is applicable to a monochromatic image recording apparatus.

Embodiment 8

The embodiment is intended to further improve the tone correcting function of the apparatus of the fourth embodiment.

The fourth embodiment enables the density uniformity to be efficiently corrected, particularly noting the difference in the tone characteristics of the individual recording heads.

In the actual recording heads, one certain recording head does not necessarily have nozzles with completely uniform tone characteristics, in other words, the tone characteristics of the nozzles are different even in one head. From this fact, a problem arises which will be described.

For the simplicity of explanation, two nozzles having different image densities will be taken.

Figure 20:
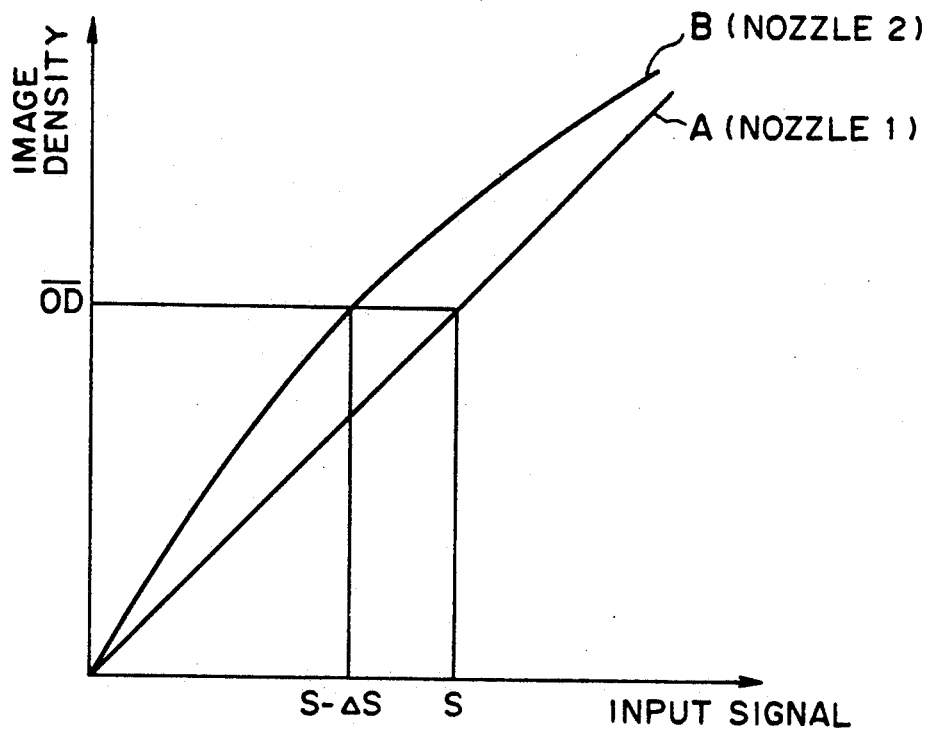
FIG. 20 shows the tone reproducibility (characteristics) of two different nozzles.

In FIG. 20, A represents the tone characteristics of a nozzle 1, and B represents the tone characteristics of a nozzle 2. As will be understood, the nozzle 2 ejects a larger amount of ink than the nozzle 1, and therefore, the tone characteristics shown are provided. When the density difference is corrected for the signal S, the image signal for the nozzle 2 is multiplied by $(S-\Delta S)/S$.

Figure 21:
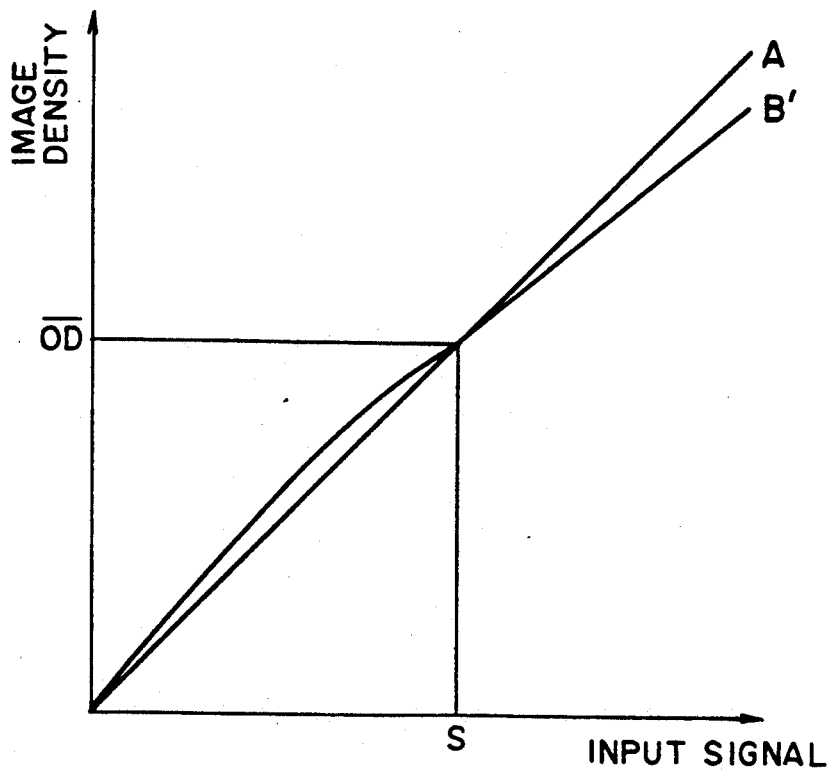
FIG. 21 shows the tone characteristics of the two nozzles when the non-uniformity corrected by the density non-uniformity correcting method.

Then, the tone characteristics B is as if it is expanded in the x direction by multiplying with $\Delta S/(S-\Delta S)$. This is shown by B' in FIG. 21. By doing so, the density deviation upon the input signal S can be corrected, but the density deviation remains in the other area. In order to correct the density deviation in all areas, the tone characteristics of the nozzles are all on the same curve or line.

Actually, however, the amounts of ink ejection of the respective nozzles are different. As a result, the tone characteristics of the nozzles are different.

Therefore, even if the density deviation can be corrected at a certain printing duty, the non-uniformity still remains with the other printing duty, and therefore, it is difficult to substantially completely correct the non-uniformity over the entire tone levels.

The problem is not limited to an ink jet printer, but also arises in the thermal transfer type printer because the dot diameter provided by the respective heaters are not uniform, and the tone characteristics are not uniform.

The eighth embodiment is intended to provide a solution to the problem.

Figure 22:
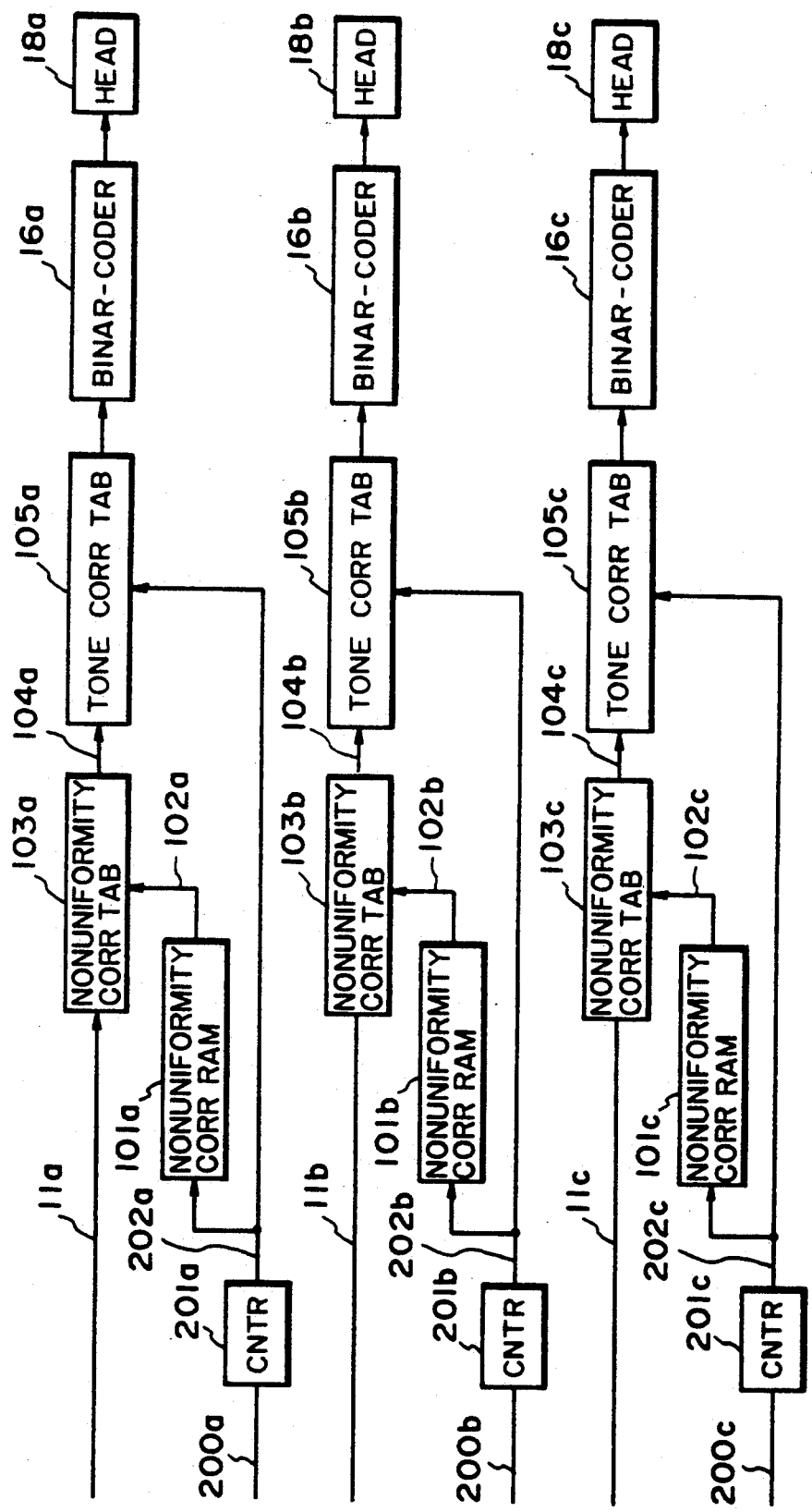
FIG. 22 is a block diagram of a circuit used in an image recording apparatus according to an eighth embodiment of the present invention.

FIG. 22 is a block diagram of a circuit used in the apparatus of the eighth embodiment. References 11a, 11b and 11c designate image signals for the cyan, magenta and yellow colors, respectively. References 104a, 104b and 104c are image signals having been subjected to the non-uniformity correcting operation for the respective colors. The apparatus comprises tone correcting tables 105a, 105b and 105c for the respective colors, binary coding circuits 16a, 16b and 16c, and ink jet recording heads 18a, 18b and 18c for the respective colors, each having 256 nozzles. References 200a, 200b and 200c designate clock signals supplied in synchronism with the image signals for the respective colors. References 202a, 202b and 202c are output signals of counters 201a, 201b and 201c, respectively.

The image signals 11a, 11b and 11c are serial image signals for the respective colors. The clock signals 200a, 200b and 200c are in synchronism with the image signals and are supplied to the counters 201a, 201b and 201c. The counter counts the clock signals to produce 8-bit signals having levels of 0–255. Since the number of nozzles of the recording head is 256, the output of the counter is indicative of the number of the nozzle to which the image signal currently processed is to be supplied.

The image signal 11a, 11b and 11c are converted by the non-uniformity correcting table 103a, 103b and 103c so that the non-uniformity of the heads 18a, 18b and 18c are corrected. The non-uniformity correcting tables 103a, 103b and 103c each contain 61 correcting lines from $Y=0.70X$ to $Y=1.30X$ with the increment of inclination of 0.01, as shown in FIG. 13. In accordance with the non-uniformity correcting signals 102a, 102b and 102c, the correcting line is switched. For example, when the picture element signal is to be supplied to the nozzle having the tendency of large dot size, the correcting line having smaller inclination is selected, and when it is supplied to the smaller dot nozzle, the correcting line of large inclination is selected. The image signal is corrected in this manner.

The non-uniformity correcting RAMs 101a, 101b and 101c store selection signals for the correcting lines required for correcting the non-uniformity peculiar to each of the heads. More particularly, it stores the correcting signals having 0–60 levels for 256 nozzles. In accordance with the output signal from the counter, the non-uniformity correcting signals 102a-102c are produced. By the $\gamma$ line selected by the non-uniformity correcting signals, the signal is corrected to the signals 104a, 104b and 104c, which are supplied to the tone characteristics correcting table 105a, 105b and 105c, and the tone characteristics of the recording head are corrected and outputted.

The tone correcting table comprises a ROM storing tone correcting curves for correcting the tone characteristics of the nozzles of the recording head so as to have a rectilinear property for 256 nozzles. Into the upper bits of the input address of the ROM, the counter output is supplied, and the correcting curves prepared for the nozzles are selected. Then, the non-uniformity correcting signals 104a, 104b and 104c are inputted to the lower bits thereof, and the tone is corrected for the individual nozzles.

The tone correcting table has been prepared beforehand on the basis of the characteristic tests for the respective heads. The tone characteristics of the individual nozzles can be determined by reading tone characteristics detecting pattern by a CCD element having the same reading density as the recording density of the head. On the basis of the detection, the correcting curves for the respective nozzles can be produced.

As shown in FIG. 14, for example, if the tone characteristics of the nozzle is as shown by B, the tone correcting curve as indicated by A is used so as to effect the tone characteristics correction so as to provide the line indicated by C (indicating the relation between the input signal and the image density). When the tone characteristics of the nozzle is as indicated by E of FIG. 15, the curve D is used so that the linear tone property as indicated by the line C can be provided. Thus, by selecting the optimum tone correcting curve for each of the nozzles, by which the relation between the input signal and the image density is on the same line for all the nozzles.

The signals thus corrected are converted to two level signals by the binary coding circuits 16a, 16b and 16c using the dithering method, the error dispersion method or the like, and drive the multi-nozzle ink jet recording heads 18a, 18b and 18c. As a result, the number of dots ejected from the nozzle having the tendency of large dot size is small, whereas the number of dots from the nozzle having the tendency of smaller dot size is large, and therefore, uniform images can be produced. At this time, since the correction is made so as to provide a linear property of the tone characteristics of each of the nozzles, the non-uniformity correcting effects can be provided for any printing duties.

Embodiment 9

A ninth embodiment will be described.

In the seven embodiment, the image signal is converted to a two level signal to effect to level recording, and therefore, the correction of the density non-uniformity is effected by changing the number of dots, but in the eighth embodiment, the size of the dot is changed.

Figure 23:
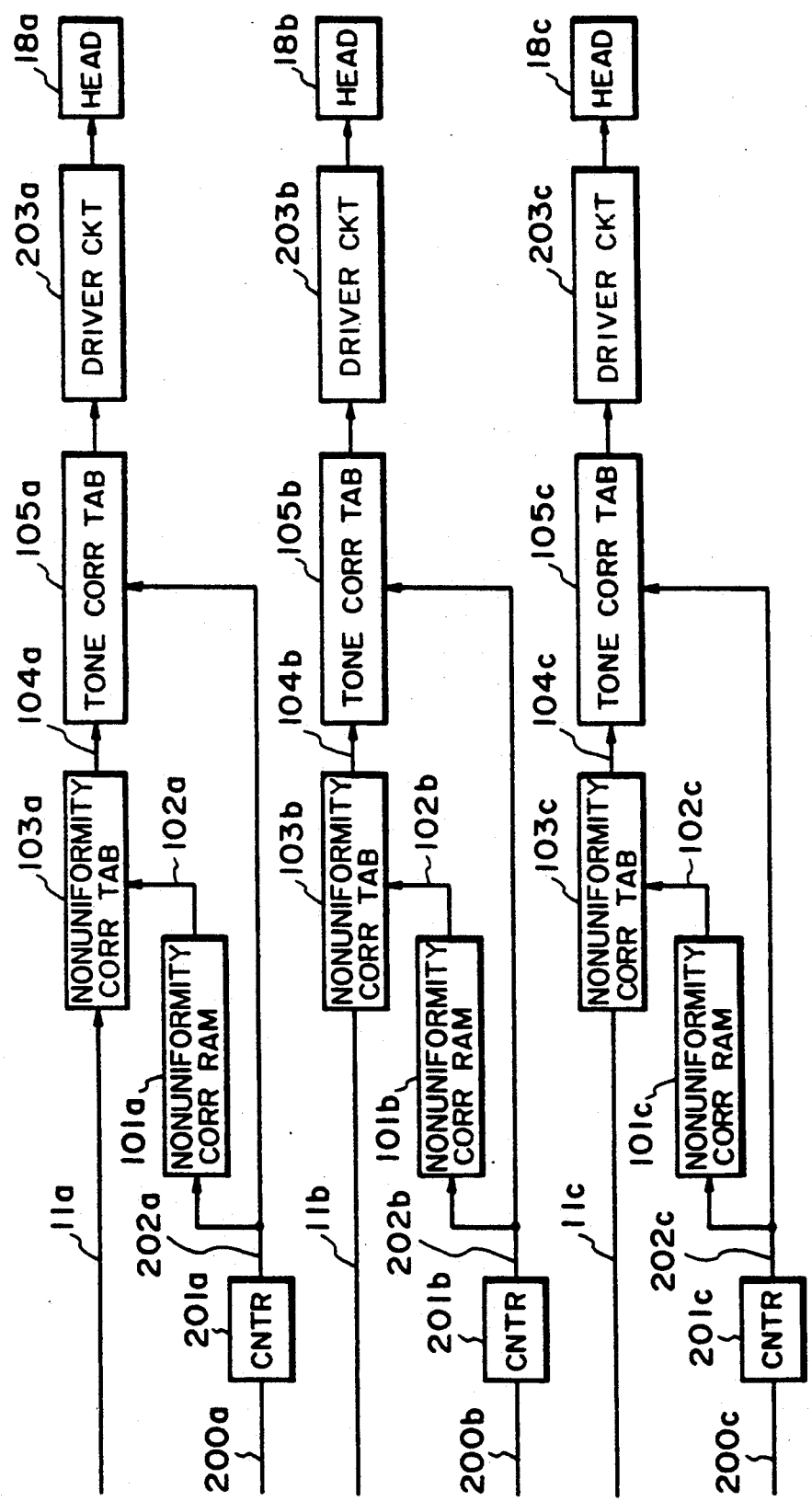
FIG. 23 is a block diagram of a circuit used in an image recording apparatus according to an ninth embodiment of the present invention.

FIG. 23 is a block diagram of a circuit used in the apparatus of the ninth embodiment. The same reference numerals as in FIG. 22 are assigned to the elements having the corresponding functions, and the description thereof are omitted for simplicity.

In FIG. 23, the apparatus comprises driving circuits 203a, 203b and 203c for producing head recording pulses having voltages proportional to the level of the image signals. The heads 18a, 18b and 18c a piezoelectric type ink jet recording heads in which the amounts of ink ejection are changed in accordance with the levels of the driving voltage, so that the dot size is changed thereby.

With this structure, when the operation similar to the seventh embodiment is carried out, the present invention is applicable in the image recording apparatus wherein the non-uniformity is corrected by correcting the dot diameter.

Embodiment 10

A tenth embodiment will be described.

The block diagram of the tenth embodiment is the same as that of FIG. 22, but the driving circuit has the function of producing a head driving signal with a pulse width proportional to the level of the image signal. The recording head is of a type in which the dot size is changeable by changing the pulse width of the driving signal.

By constructing this embodiment in this way, the same advantageous effects as in the ninth embodiment can be provided.

In this embodiment, an ink jet recording head is used, but the present invention is not limited to such as is applicable to an entire multi-element recording head such as a thermal head for a thermal transfer type printer.

In one certain recording head, all of the recording elements do not provide the same density characteristics and tone characteristics. However, there is a tendency that the characteristics of adjacent recording elements are relatively the same. Therefore, the density non-uniformity correcting and the tone correction are not necessarily required to be made to the individual image recording elements. On the contrary, they are classified into plural blocks containing plural recording elements, and the control is effected to the blocks.

In the foregoing embodiment, the description has been made as to the image recording apparatus for providing a color image using cyan, magenta and yellow colors, but the present invention is applicable to a monochromatic color image recording apparatus.

In the eighth, ninth and tenth embodiments, if the density non-uniformity of the recording head is not very conspicuous, only the tone correction may be effected for the individual image recording elements without density non-uniformity correction.

Referring to FIG. 24, the description will be made as to the tone correction and the density non-uniformity correction. When the density non-uniformity correction is made to the nozzles having two tone characteristics E1 and F1, then the tone characteristics E2 and F2 as shown in FIG. 24B result. If the tone correction is added, the tone characteristics E3 and F3 shown in FIG. 24C are provided. On the other hand, if the density non-uniformity correction is not made to the tone characteristics E1 and F1, and only the tone correction is effected thereto, the tone characteristics E4 and F4 as shown in FIG. D result.

As will be understood from the foregoing, the density non-uniformity correction is effected in order to remove or reduce the density differences among the recording elements by the correction so as to provide the same image density by the image recording elements in response to a predetermined input signal (50% printing duty in the Figure). The tone correction is the correction so as to provide the predetermined tone characteristics (rectilinear line in the Figure).

The present invention is particularly suitably usable in a bubble jet recording head and recording apparatus developed by Canon Kabushiki Kaisha, Japan. This is because high density of the picture elements and high resolution of the recording are possible.

The typical structure and the operational principle are preferably as disclosed in U.S. Pat. Nos. 4,723,129 and 4,740,796. The principle is applicable to a so-called on-demand type recording system, and a continuous type recording system particularly however, it is suitable for the on-demand type because the principle is such that at least one driving signal is applied to an electrothermal transducer disposed on a liquid (ink) retaining sheet or liquid passage, the driving signal being enough to provide such a quick temperature rise beyond nucleate boiling, by which the thermal energy is provided by the electrothermal transducer to produce film boiling on the heating portion of the recording head, whereby a bubble can be formed in the liquid (ink) corresponding to each of the driving signals. By the development and collapse of the bubble, the liquid (ink) is ejected through an ejection outlet to produce at least one droplet. The driving signal is preferably in the form of a pulse, because the development and collapse of the bubble can be effected instantaneously, and therefore the liquid (ink) is ejected with quick response. The driving signal in the form of a pulse is preferably such as disclosed in U.S. Pats. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application Publication No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because, the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and a plural recording head combined to cover the entire width.

In addition, the present invention is applicable to a serial type recording head wherein the recording head is fixed on the main assembly, to a replaceable chip type recording head which is connected electrically with the main apparatus and can be supplied with the ink by being mounted in the main assembly, or to a cartridge type recording head having an integral ink container.

The provision of the recovery means and the auxiliary means for the preliminary operation are preferable, because they can further stabilize the effect of the present invention. As for such means, there are capping means for the recording head, cleaning means therefor, pressing or sucking means, preliminary heating means by the ejection electrothermal transducer or by a combination of the ejection electrothermal transducer and additional heating element and means for preliminary ejection not for the recording operation, which can stabilize the recording operation.

As regards the kind of the recording head it may be single corresponding to a single color ink, or may be plural corresponding to the plurality of ink materials having different recording color or density. The present invention is effectively applicable to an apparatus having at least one of a monochromatic mode mainly with black, a multi-color and with different color ink materials and a full-color mode by the mixture of the colors which may be an integrally formed recording unit or a combination of plural recording heads.

Furthermore, in the foregoing embodiments the ink has been liquid. It may be, however, an ink material solidified at room temperature or below and liquefied at room temperature. Since in the ink jet recording system, the ink is controlled within the temperature not less than 30° C. and not more than 70° C. to stabilize the viscosity of the ink to provide the stabilized ejection, in usual recording apparatus of this type, the ink is such that it is liquid within the temperature range when the recording signal is applied. In addition, the temperature rise due to the thermal energy is positively prevented by consuming it for the state change of the ink from the solid state to the liquid state, or the ink material is solidified when it is left is used to prevent the evaporation of the ink. In either of the cases, the application of the recording signal producing thermal energy, the ink may be liquefied, and the liquefied ink may be ejected. The ink may start to be solidified at the time when it reaches the recording material. The present invention is applicable to such an ink material as is liquefied by the application of the thermal energy. Such an ink material may be retained as a liquid or solid material on through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, a copying apparatus combined with an image reader or the like, or a facsimile machine having information sending and receiving functions.

As described in the foregoing, according to the present invention, the tone correcting curve is selectable in accordance with the tone characteristics of the recording heads, and therefore, high quality recorded images can be provided with good tone reproducibility and with good color balance even if the recording head is changed or even if the recording head property is changed with use or with time.

According to the present invention, the density non-uniformity correcting data can be produced for a short period of time, and therefore, the inoperative period of the machine can be minimized.

In addition, according to the present invention, the image signal is corrected to compensate for the density non-uniformity of the recording head, and furthermore, the tone characteristics correction is made to the individual recording elements of the multi-elements recording heads, and therefore, the images without density non-uniformity can be provided with any printing duties.

While the invention has been described with reference to the structures disclosed herein, it is not confined to the details set forth and this application is intended to cover such modifications or changes as may come within the purposes of the improvements or the scope of the following claims.

What is claimed is:

1. An image recording apparatus for recording an image using a plurality of recording heads, each recording head being capable of recording an image, having particular tone characteristics, in response to an image signal supplied to the recording head, the apparatus comprising:

a plurality of tone correcting means for correcting the image signal to be supplied to a corresponding recording head in accordance with tone correcting information associated with that recording head; and tone correcting information setting means for setting the tone correcting information for each recording head in accordance with the particular tone characteristics associated with that recording head.

2. An apparatus according to claim 1, wherein said tone correction information setting means includes signal generating means for generating a tone-characteristic signal corresponding to the particular tone characteristics associated with each recording head and sets the tone correcting information in accordance with the tone-characteristic signal generated by said signal generating means.

3. An apparatus according to claim 2, wherein said signal generating means comprises a ROM mounted on each recording head.

4. An apparatus according to claim 2, wherein said signal generating means comprises pattern outputting means for outputting a tone-characteristic detecting pattern to be recorded by each recording head, image reading means for reading the pattern and process means for comparing an output of said reading means with predetermined tone-correcting characteristics to determine the tone characteristics associated with that recording head.

5. An apparatus according to claim 1, wherein said tone correcting information setting means comprises pattern outputting means for outputting a tone-characteristic detecting pattern to be recorded by each recording head, image reading means for reading the pattern, process means for determining a desired tone-correcting curve for that recording head on the basis of data from said image reading means and signal outputting means for outputting the desired tone-correcting curve as the tone correcting information.

6. An apparatus according to claim 1, wherein each recording head comprises an ink jet recording head for ejecting ink through ejection outlets.

7. An apparatus according to claim 6, wherein each recording head includes thermal energy producing means disposed adjacent the ejection outlets to change the state of the ink and eject the ink through the ejection outlets.

8. An apparatus according to claim 7, wherein said apparatus is a facsimile machine.

9. An apparatus according to claim 7, wherein said apparatus is a copying machine.

10. An apparatus according to claim 1, wherein the plurality of recording heads comprises plural recording head elements to effect recording in different colors to form a color image.

11. An apparatus according to claim 1, wherein each recording head records dots and changes the tone of the image by changing a number of dots in accordance with the corrected image signal supplied thereto.

12. An apparatus according to claim 1, wherein each recording head records dots and changes the tone of the image by changing dot size in accordance with the corrected image signal supplied thereto.

13. An apparatus according to claim 1, wherein said apparatus is a facsimile machine.

14. An apparatus according to claim 1, wherein said apparatus is a copying machine.

15. An image recording apparatus for recording an image using a plurality of recording heads, each recording head having plural image recording elements and being capable of recording an image, having particular tone and density characteristics, in response to an image signal supplied to the recording head, the apparatus comprising:
   density non-uniformity correcting means for correcting the image signal to be supplied to the recording heads to substantially compensate for non-uniform density characteristic of the image recorded by the plural image recording elements of the recording heads;
   a plurality of tone correcting means for correcting the image signal to be supplied to a corresponding recording head in accordance with tone correcting information associated with that recording head; and
   tone correcting information setting means for setting the tone correcting information for each recording head in accordance with the particular tone characteristics associated with that recording head.

16. An apparatus according to claim 15, wherein said tone correction information setting means includes signal generating means for generating a tone-characteristic signal corresponding to the particular tone characteristics associated with each recording head and sets the tone correcting information in accordance with the tone-characteristic signal generated by said signal generating means.

17. An apparatus according to claim 16, wherein said signal generating means comprises a ROM mounted on each recording head.

18. An apparatus according to claim 16, wherein said signal generating means comprises pattern outputting means for outputting a tone-characteristic detecting pattern to be recorded by each recording head, image reading means for reading the pattern and process means for comparing an output of said reading means with predetermined tone-correcting characteristics to determine the tone characteristics associated with that recording head.

19. An apparatus according to claim 15, wherein said tone correcting information setting means comprises pattern outputting means for outputting a tone-characteristic detecting pattern to be recorded by each recording head, image reading means for reading the pattern, process means for determining a desired tone-correcting curve for that recording head on the basis of data from said image reading means and signal outputting means for outputting the desired tone-correcting curve as the tone correcting information.

20. An apparatus according to claim 15, wherein each recording head comprises an ink jet recording head for ejecting ink through ejection outlets.

21. An apparatus according to claim 20, wherein each recording head includes thermal energy producing means disposed adjacent the ejection outlets to change the state of the ink and eject the ink through the ejection outlets.

22. An apparatus according to claim 21, wherein said apparatus is a facsimile machine.

23. An apparatus according to claim 21, wherein said apparatus is a copying machine.

24. An apparatus according to claim 16, wherein the plurality of recording heads comprises plural recording head elements to effect recording in different colors to form a color image.

25. An apparatus according to claim 15, wherein each recording head records dots and changes the tone of the image by changing a number of dots in accordance with the corrected image signal supplied thereto.

26. An apparatus according to claim 15, wherein each recording head records dots and changes the tone of the image by changing dot size in accordance with the corrected image signal supplied thereto.

27. An apparatus according to claim 15, wherein said tone correcting means effects correction of the image signal after the image signal is corrected by said density non-uniformity correcting means.

28. An apparatus according to claim 15, wherein said density non-uniformity correcting means effects correction of the image signal for groups of the image recording elements, each group including plural image recording elements.

29. An apparatus according to claim 15, wherein said density non-uniformity correcting means effects correction of the image signal for individual image recording elements.

30. An apparatus according to claim 15, wherein said apparatus is a facsimile machine.

31. An apparatus according to claim 15, wherein said apparatus is a copying machine.

32. An image recording apparatus comprising:
   a recording head having a plurality of image recording elements capable of recording an image, having particular tone and density characteristics, in response to an image signal supplied to said recording head;
   density non-uniformity correcting means for correcting the image signal to be supplied to said recording head to substantially compensate for non-uniform density characteristics of the image recorded by said plural recording elements; and
   tone correcting means for correcting the image signal to be supplied to said image recording elements in accordance with tone correcting information associated with respective groups of said image recording elements to match the image signal with the tone characteristics associated with said recording head, wherein each said group includes a predetermined number of said image recording elements.

33. An apparatus according to claim 32, wherein said tone correcting means effects tone correction of the image signal for each individual said recording element.

34. An apparatus according to claim 32, wherein said recording head comprises an ink jet recording head for ejecting ink through ejection outlets.

35. An apparatus according to claim 34, wherein said recording head includes thermal energy producing means disposed adjacent said ejection outlets to change the state of the ink and eject the ink through said ejection outlets.

36. An apparatus according to claim 35, wherein said apparatus is a facsimile machine.

37. An apparatus according to claim 35, wherein said apparatus is a copying machine.

38. An apparatus according to claim 32, wherein said tone correcting means effects tone correction of the image signal after the image signal is corrected by said density non-uniformity correcting means.

39. An apparatus according to claim 32, wherein said density non-uniformity correcting means effects correction of the image signal for groups of said image recording elements, each said group including plural said image recording elements.

40. An apparatus according to claim 32, wherein said density non-uniformity correcting means effects correction of the image signal for individual said image recording elements.

41. An apparatus according to claim 32, wherein said apparatus is a facsimile machine.

42. An apparatus according to claim 32, wherein said apparatus is a copying machine.

43. An apparatus according to claim 32, wherein said recording head comprises an ink jet recording head for ejecting ink through ejection outlets.

44. An apparatus according to claim 43, wherein said recording head includes thermal energy producing means disposed adjacent said ejection outlets to change the state of the ink and eject the ink through said ejection outlets.

45. An apparatus according to claim 44, wherein said apparatus is a facsimile machine.

46. An apparatus according to claim 44, wherein said apparatus is a copying machine.

47. An image recording apparatus comprising:
a recording head having a plurality of image recording elements capable of recording an image, having particular tone characteristics, in response to an image signal supplied to said recording head; and
tone correcting means for correcting the image signal to be supplied to said image recording elements in accordance with tone correcting information associated with respective groups of said image recording elements to match the image signal with the tone characteristics associated with said recording head, wherein each said group includes a predetermined number of said image recording elements.

48. An apparatus according to claim 47, wherein said recording head comprises plural recording head elements to effect recording in different colors to form a color image.

49. An apparatus according to claim 47, wherein said recording head records dots and changes the tone of the image by changing a number of dots in accordance with the corrected image signal supplied thereto.

50. An apparatus according to claim 47, wherein said recording head records dots and changes the tone of the image by changing dot size in accordance with the corrected image signal supplied thereto.

51. An apparatus according to claim 47, wherein said apparatus is a facsimile machine.

52. An apparatus according to claim 47, wherein said apparatus is a copying machine.

53. An image recording apparatus comprising:
a recording head having a plurality of image recording elements capable of recording an image, having particular tone and density characteristics, in response to an image signal supplied to said recording head;
non-uniformity correcting means for controlling the image signal in accordance with non-uniform density characteristics of the image recorded by said recording head; and
tone correcting means for correcting the image signal for respective groups of said image recording elements in accordance with the tone characteristics associated with said recording head.

* * * * *

UNITED STATES PATENT AND TRADEMARK OFFICE
CERTIFICATE OF CORRECTION

PATENT NO. : 5,285,220
DATED : February 8, 1994
INVENTOR(S) : AKIO SUZUKI, ET AL.

It is certified that error appears in the above-identified patent and that said Letters Patent is hereby corrected as shown below:

COLUMN 1

Line 23, "together with" should read --because of the extensive--.
Line 24, "wider" should be deleted.
Line 32, "a" should be deleted.
Line 39, "head" should read --heads--.
Line 44, "significant" (second occurrence) should be deleted.
Line 67, "are corrected" should be deleted.

COLUMN 2

Line 30, "However" should read --However,--.
Line 45, "occurs" should read --occurs,--.

COLUMN 4

Line 54, "non-uniformity" should read --non-uniformity is--.

COLUMN 5

Line 49, "provided" should read --provide--.

COLUMN 14

Line 17, "an" should read --an ink--.

COLUMN 16

Line 45, "seven" should read --seventh--.

UNITED STATES PATENT AND TRADEMARK OFFICE
CERTIFICATE OF CORRECTION

PATENT NO. : 5,285,220
DATED : February 8, 1994
INVENTOR(S) : AKIO SUZUKI, ET AL.

Page 2 of 2

It is certified that error appears in the above-identified patent and that said Letters Patent is hereby corrected as shown below:

COLUMN 18

Line 1, "particularly" should read --particularly,--.
   Line 65, "head" should read --head,--.

COLUMN 19

Line 7, "embodiments" should read --embodiments,--.

COLUMN 22

Line 3, "claim 16," should read --claim 15,--.

COLUMN 23

Line 16, "claim 32," should read --claim 47,--.

Signed and Sealed this

Thirtieth Day of August, 1994

Attest:

BRUCE LEHMAN

Attesting Officer

Commissioner of Patents and Trademarks